(12) United States Patent
Pecen et al.

(10) Patent No.: US 10,841,295 B1
(45) Date of Patent: Nov. 17, 2020

(54) EXTENSIONS FOR USING A DIGITAL CERTIFICATE WITH MULTIPLE CRYPTOSYSTEMS

(71) Applicant: ISARA Corporation, Waterloo (CA)

(72) Inventors: Mark Pecen, Waterloo (CA); Michael Kenneth Brown, Fergus (CA); Alexander Truskovsky, Waterloo (CA)

(73) Assignee: ISARA Corporation, Waterloo (CA)

( * ) Notice: Subject to any disclaimer, the term of this patent is extended or adjusted under 35 U.S.C. 154(b) by 0 days.

(21) Appl. No.: 16/387,245

(22) Filed: Apr. 17, 2019

Related U.S. Application Data

(62) Division of application No. 16/176,274, filed on Oct. 31, 2018, now Pat. No. 10,425,401.

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3268* (2013.01); *H04L 63/0815* (2013.01)

(58) Field of Classification Search
CPC ............. H04L 63/0823; H04L 63/0815; H04L 9/3247; H04L 9/3268
See application file for complete search history.

(56) References Cited

U.S. PATENT DOCUMENTS

| 5,432,852 | A | 7/1995 | Leighton et al. |
| 7,152,158 | B2 | 12/2006 | Watanabe et al. |
| 7,404,077 | B1 | 7/2008 | Peters et al. |
| 9,575,906 | B2 | 2/2017 | Oxford |
| 9,660,978 | B1 | 5/2017 | Truskovsky et al. |
| 9,794,249 | B1 | 10/2017 | Truskovsky et al. |
| 9,800,411 | B1 | 10/2017 | Brown et al. |
| 2002/0038420 | A1 | 3/2002 | Collins et al. |
| 2002/0108041 | A1 | 8/2002 | Watanabe et al. |
| 2003/0009694 | A1 | 1/2003 | Wencour et al. |

(Continued)

FOREIGN PATENT DOCUMENTS

| CA | 2657743 | 6/2009 |
| JP | 2002207427 | 7/2002 |

(Continued)

OTHER PUBLICATIONS

JPO, Office Action dated Dec. 25, 2018, in JP 2018-533833, 11 pgs.

(Continued)

*Primary Examiner* — Dao Q Ho

(74) *Attorney, Agent, or Firm* — Henry Patent Law Firm PLLC

(57) ABSTRACT

In a general aspect, a digital certificate can be used with multiple cryptography systems ("cryptosystems"). In some cases, the digital certificate includes a public key field, which contains a first public key of an entity associated with a first cryptosystem. The digital certificate includes a signature value field, which contains a first digital signature of a certificate authority associated with the first cryptosystem. The digital certificate includes an extension. The extension contains a second public key of the entity, a second digital signature of the certificate authority, or both, associated with a second cryptosystem. The extension contains a policy field that includes instructions for processing the fields associated with the second cryptosystem.

19 Claims, 13 Drawing Sheets

(56) References Cited

U.S. PATENT DOCUMENTS

| | | |
|---|---|---|
| 2003/0041110 A1 | 2/2003 | Wencour et al. |
| 2004/0003235 A1 | 1/2004 | Musa |
| 2005/0144437 A1 | 6/2005 | Ransom |
| 2008/0104401 A1 | 5/2008 | Miyamoto et al. |
| 2009/0210703 A1 | 8/2009 | Epstein et al. |
| 2010/0332820 A1 | 12/2010 | Matsushima et al. |
| 2011/0055585 A1 | 3/2011 | Lee |
| 2011/0142242 A1 | 6/2011 | Tanaka |
| 2012/0233457 A1 | 9/2012 | Zaverucha |
| 2012/0284508 A1 | 11/2012 | Zaverucha |
| 2013/0097420 A1 | 4/2013 | Zaverucha |
| 2013/0159702 A1 | 6/2013 | Peeters |
| 2013/0246281 A1 | 9/2013 | Yamada et al. |
| 2013/0290713 A1 | 10/2013 | Zaverucha et al. |
| 2014/0365779 A1 | 12/2014 | Brown et al. |
| 2015/0254451 A1 | 9/2015 | Doane et al. |

FOREIGN PATENT DOCUMENTS

| | | |
|---|---|---|
| JP | 2010-081154 | 4/2010 |
| WO | 2008050792 | 5/2008 |

OTHER PUBLICATIONS

USPTO, Notice of Allowance dated Feb. 4, 2019, in U.S. Appl. No. 16/176,274, 22 pgs.
USPTO, Notice of Allowance dated Aug. 11, 2017, in U.S. Appl. No. 15/480,529, 32 pgs.
Canadian Intellectual Property Office, International Search Report and Written Opinion for International App. No. PCT/CA2017/050317 dated May 30, 2017, 8 pages.
"European Telecommunications Standards Institute (ETSI); Quantum Safe Cryptography and Security, ETSI White Paper No. 8, France", Jun. 2015, 64 pgs.
"RFC 7292, PKCS #12: Personal Information Exchange Syntax v1.1, IETF, 2014, 29 pages."
Bernstein, Daniel, et al., "Post-Quantum Cryptography", Springer; ISBN: 978-3-540-88701-0, 2009, 248 pages.
Buchmann, et al., "XMSS—A Practical Forward Secure Signature Scheme based on Minimal Security Assumptions", ia.cr/2011/484, Nov. 2011, 23 pgs.
Cooper, et al., "Internet X.509 Public Key Infrastructure Certificate and Certificate Revocation List (CRL) Profile, Network Working Group, RFC 5280", May 2008, 151 pgs.
Huelsing, et al., "XMSS: eXtended Merkle Signature Scheme", Internet Research Task Force (IRTF); Request for Comments: 8391; ISSN: 2070-1721, May 2018, 74 pgs.
McGrew, et al., "Hash-Based Signatures, draft-mcgrew-hash-sigs-04, Crypto Forum Research Group", Mar. 21, 2016, 43 pgs.
Menezes, et al., "Chapter 10—Identification and Entity Authentication, Handbook of Applied Cryptography, CRC Press", 1997, 41 pgs.
Menezes, et al., "Chapter 11—Digital Signatures, Handbook of Applied Cryptography, CRC Press", 1997, 65 pgs.
Menezes, et al., "Chapter 4—Public Key Parameters, Handbook of Applied Cryptography, CRC Press", 1997, 37 pgs.
Moriarty, et al., "PKCS #12: Personal Information Exchange Syntax v1.1", IETF, RFC: 7292, Jul. 2014, 29 pgs.
USPTO, Non-final Office Action issued in U.S. Appl. No. 15/480,529 dated Jun. 2, 2017, 25 pages.
USPTO, "Non-Final Office Action", issued in U.S. Appl. No. 15/230,819 dated Oct. 24, 2016, 30 pages.
USPTO, "Notice of Allowance", issued in U.S. Appl. No. 15/230,819 dated Feb. 15, 2017, 25 pages.
JPO, Final Rejection dated May 27, 2019, in JP 2018-533833, 10 pgs.
WIPO, International Search Report and Written Opinion dated Jun. 26, 2019, in PCT/CA2019/050550, 8 pgs.
"Information technology—Open Systems Interconnection—The Directory: Public-key and attribute certificate frameworks", ITU-T, Series X: Data Networks, Open System Communications and Security; vol. X.509 Oct. 2016, 254 pgs.
EPO, Extended European Search Report dated Mar. 3, 2020, in EP 17838243.8, 7 pgs.

EXTENSIONS FOR USING A DIGITAL CERTIFICATE WITH MULTIPLE CRYPTOSYSTEMS

CROSS-REFERENCE TO RELATED APPLICATIONS

This application is a divisional application of U.S. patent application Ser. No. 16/176,274, filed Oct. 31, 2018, the disclosure of which is hereby incorporated by reference.

BACKGROUND

The following description relates to using extensions in a digital certificate with multiple cryptography systems ("cryptosystems"), for example, in a public key infrastructure.

Cryptography systems are used to communicate securely over public channels. For example, some cryptosystems provide confidentiality by encrypting messages, and some cryptosystems provide authenticity through digital signatures. Many cryptosystems include protocols that use cryptographic keys. For example, in a public key infrastructure (PKI), the cryptographic keys include public and private keys for each entity, and a certificate authority can issue digital certificates to certify the public keys.

DETAILED DESCRIPTION

Figure 1:
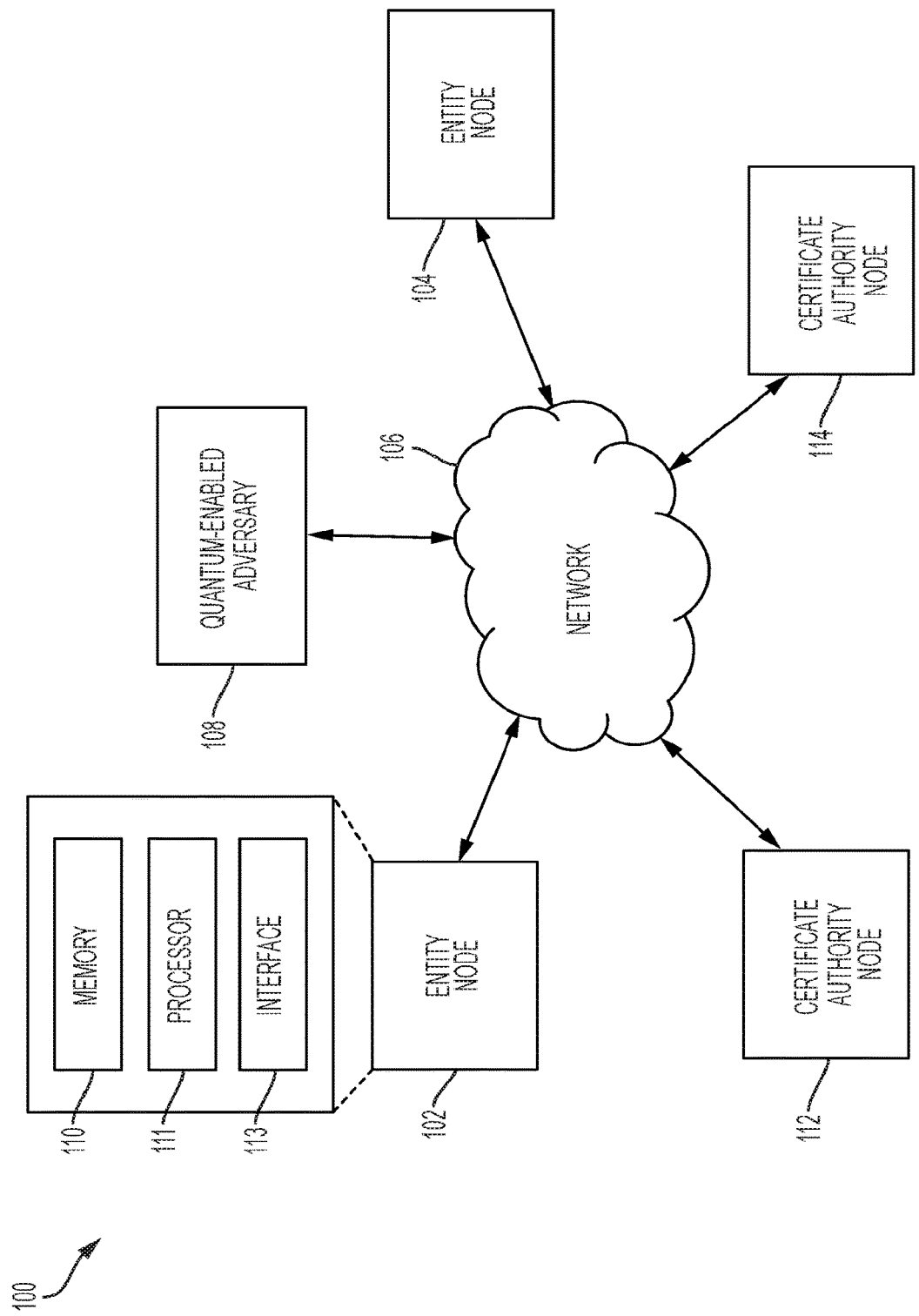
FIG. 1 is a block diagram showing aspects of an example communication system.

In some aspects of what is described here, a digital certificate can be used with multiple cryptosystems. The digital certificate can include components (e.g., digital signatures, public keys, etc.) for each of the cryptosystems. In some cases, such digital certificates can be used in the context of deploying a new authentication algorithm within an enterprise infrastructure. For instance, such "hybrid" digital certificates can be used in a phased approach to gradually rollout the new cryptosystem as various system components are upgraded to support the new cryptosystem.

In one aspect, a new cryptosystem, using a different authentication algorithm, may be deployed because a legacy algorithm is deemed to no longer be secure. For instance, an attacker who understands that the legacy algorithm is no longer secure may be able to force the use of the legacy algorithm, thereby making the system vulnerable to attack. In this case, a hybrid digital certificate may be used to circumvent downgrade-attacks on a certificate that contains a legacy algorithm and an updated algorithm. In some implementations, hybrid digital certificates can be used by a quantum-vulnerable cryptosystem (e.g., a conventional quantum-vulnerable cryptosystem) and an upgraded quantum-resistant cryptosystem, for example, during a transition from the quantum-vulnerable cryptosystem to the quantum-resistant cryptosystem. In some examples, by placing components for the quantum-resistant cryptosystem (e.g., a quantum-resistant public key, a quantum-resistant digital signature, etc.) and components for the quantum-vulnerable cryptosystem (e.g., a quantum-vulnerable public key, a quantum-vulnerable digital signature, etc.) in a single certificate, multiple effective certificate chains can be embedded into a single certificate chain structure or encoding. With such hybrid certificates, legacy applications can continue using the quantum-vulnerable cryptosystem while upgraded applications can start using the quantum-resistant cryptosystem, allowing both cryptosystems to co-exist in a communication system. In some implementations, hybrid digital certificates include a policy providing instructions for upgraded applications to process multiple cryptosystems, e.g. to process digital certificates that include multiple public keys and/or multiple certificate authority signatures, and to process multiple certificate chains in a single certificate chain. For example, in a hybrid digital certificate, a quantum-safe signature may be a concatenation of multiple signatures produced by the issuer using different quantum-safe algorithms, such as when any single cryptography scheme is not sufficiently trusted to be used by itself. In some cases, the issuer provides a policy for processing the quantum-safe signature.

In an aspect, a policy provides instructions to a system, e.g. a client, processing a digital certificate with multiple signatures. In some cases, the instructions may indicate that a certain number of the signatures in the chain are to be validated. For example, if the policy requires that two out of three signatures be validated, then one signature check failure would be sufficient to validate the certificate, but two signature check failures would not be sufficient, and the validation would result in a failure. In another example, the policy may indicate that the signatures are to be verified in a priority order. Continuing the previous example, the policy may indicate which of three signatures is most important, and if validation of that signatures fails, then the validation fails and an error is reported. On the other hand, if the prioritized signature is validated, then the system needs to validate just one of the other remaining signatures to validate the certificate.

In some cases, a subject requesting a certificate, e.g. an updated client, may include a policy in the Certificate Signing Request (CSR) which the issuing certificate authority (CA) may add to the digital certificate. In some instances, other instructions originating from the issuing CA may be added to the extensions of the digital certificate, e.g. instructions for verifying signatures in a certificate chain. In some cases, the policy instructions, from the requester and/or from the issuing CA, are added to a policy field in the extensions of the digital certificate.

In some implementations, a multi-phase upgrade is used to transition between cryptosystems. With each phase of the transition, additional system components are upgraded, and the reliance on the upgraded (e.g., quantum-resistant) cryptosystem increases. In some examples, a phase of the transition includes upgrading one or more applications and modifying end-entity certificates. In some examples, another phase of the transition includes upgrading a public key infrastructure (PKI) and modifying CA certificates. In some examples, another phase of the transition includes upgrading all remaining applications and removing certificate modifications. Such multi-phase upgrades can be used, for example, in migrations from a quantum-vulnerable cryptosystem to a quantum-resistant cryptosystem or in another type of migration (e.g., in an upgrade to a more secure digital signature algorithm, etc.). In some cases, a policy is included in the certificates to provide instructions for handling the different cryptosystems in a certificate during the different phases.

Enterprise systems using PKI can be complex and may involve a number of entities spanning wide geographical or organizational ranges. For example, some large organizations (e.g., corporate organizations, government organizations, etc.) may have millions of users and associated credentials, and they may be deployed across multiple affiliated groups who maintain trust associations (e.g., via entities such as, for example, "Bridge CAs" or other types of entities). In these and other examples, when two entities communicate, the trust relationship between them may involve traversing a number of different certificate authorities maintained within different organizations. Systems having such features and complexities can be transitioned using multiple phases, for example, to ensure continuity and security. In some implementations, entities can perform authentication and identification using the old cryptosystem or the new cryptosystem during one or more phases of the transition, for example, after PKIs and associated applications are upgraded. In an implementation, a policy provides instructions to entities for performing authentication and identification using the old and the new cryptosystem during one or more phases of the transition.

FIG. 1 is a block diagram showing aspects of an example communication system 100. The example communication system 100 shown in FIG. 1 includes four nodes—two entity nodes 102, 104, and two certificate authority nodes 112, 114. The nodes use a cryptographic scheme to communicate with each other over a network 106. In the example shown, a quantum-enabled adversary 108 has access to the network 106, information exchanged on the network 106 or both. In some instances, the quantum-enabled adversary can modify information on the network 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client in a served network, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the communication system 100 uses a public key infrastructure (PKI) for cryptographic correspondence. In a typical public key infrastructure (PKI), entities can authenticate each other based on certificates issued by trusted certificate authorities. The entities in the PKI (e.g., users, user accounts, devices or machines, software modules or other types of entities) each have a user identity and a key pair that includes a public key and a private key, and a certificate authority can issue a digital certificate to bind the public key to the entity's user identity.

In some example PKIs, there are two types of digital certificates—certificate authority (CA) certificates and end-entity certificates. A CA certificate can be used to authenticate other certificates. An end-entity certificate can be used to identify an entity (the certificate owner). In the example shown in FIG. 1, each of the entity nodes 102, 104 can be associated with an entity that has an end-entity certificate, and each of the certificate authority nodes 112, 114 can be associated with a certificate authority that has a CA certificate.

Some example PKIs use certificate chains. In a typical certificate chain, a root CA certificate resides at the top of the certificate chain, an end-entity certificate resides at the bottom of the certificate chain, and one or more intermediate CA certificates reside in the middle of the certificate chain (between the root CA certificate and the end-entity certificate). A root CA certificate can be hardcoded and explicitly trusted by the entities in the PKI. An end-entity certificate can be issued to an entity in the PKI and contain the entity's user identity. In some instances, a root certificate authority may issue intermediate CA certificates to subordinate certificate authorities, or a root certificate authority may issue end-entity certificates. In some instances, an intermediate certificate authority may issue intermediate CA certificates to subordinate certificate authorities, or an intermediate certificate authority may issue end-entity certificates. As an example, the certificate authority node 112 in FIG. 1 may be associated with a root certificate authority that has a root CA certificate, and the root certificate authority may issue an intermediate CA certificate to a certificate authority associated with the other certificate authority node 114. The intermediate certificate authority may issue end-entity certificates to entities associated with the entity nodes 102, 104.

An example of a standardized public key infrastructure is the X.509 public key infrastructure, which uses X.509 digital certificates. X.509 certificates typically include a number of basic fields and one or more extensions. The basic fields of an X.509 certificate may include, for example, a signature value field, an issuer field, a validity field, a subject field, a public key field (also called the "subject public key info" field) and others. The signature value field of an X.509 certificate may contain the digital signature computed by the certificate authority to sign the certificate. The issuer field of an X.509 certificate may contain information that identifies the entity that has signed and issued the certificate. The validity field of an X.509 certificate may contain information that identifies the time interval during which the certificate authority warrants that it will maintain information about the status of the certificate. The subject field of an X.509 certificate may contain information (e.g., a user identity) that identifies the entity associated with the public key stored in the public key field (the certificate owner). The public key field of an X.509 certificate may contain the public key of the entity. The public key field of an X.509 certificate may also contain information identifying the cryptographic algorithm with which the pubic key is used.

The extensions of an X.509 certificate may include, for example, standard extensions, private extensions and possibly other types of extensions. Standard extensions may include, for example, key identifiers, key usage information, certificate policies, alternative names, constraints and other types of information. In some implementations, an X.509 certificate can be modified to include additional extensions that are not included in the standard extensions. For instance, an X.509 certificate can be modified to have a private extension that includes another signature value (e.g., another digital signature computed by the certificate authority to sign the certificate using a private key associated with another cryptosystem), another public key of the entity (e.g., a public key associated with another cryptosystem). An X.509 certificate may include other types of information and other extensions or fields.

In some implementations, a private extension containing signature values and/or other public keys of one or more other cryptosystems (e.g. alternate algorithms and parameters) is non-critical, and optional, information for legacy systems. In an example, a legacy system that does not support a second, or alternate, cryptosystem will not need to process the fields in the extension containing information associated with the second cryptosystem and may therefore, simply ignore it that information. On the other hand, for systems that are updated with a second, or other alternate, cryptosystem, the additional information in the private extension is necessary to process the digital certificate. Updated systems, such as CAs or client entities, will understand how to access and process the additional information in the private extension. In some implementations, the upgraded systems are provided with a policy that provides instructions for processing information, e.g. signatures and public keys, in the hybrid digital certificate.

For example, rather than relying on a general information technology (IT) policy to process a digital certificate with a second, or other alternate, cryptosystem, a policy is included in the private extension of the digital signature itself to control the systems that understand the second, or alternate, cryptosystems used in hybrid digital certificates. This may provide the advantage of increasing the difficulty of a downgrade-attack. Thus, while legacy systems may ignore information in the extension about the second, or other alternate, cryptosystem, upgraded systems require the information to process the digital certificate and in some cases, are provided instructions for processing the digital certificate in light of the upgrade.

In an implementation, a private extension may specify to systems that understand the alternate cryptosystem (e.g. quantum-safe cryptosystem) that they cannot ignore the private extension even though it is deemed non-critical, or optional. That is, these systems are subject to adherence to the instructions and parameters contained in a critical extension contained in, or layered within, the non-critical extension. In an example in which a quantum-vulnerable cryptosystem is updated to a quantum-safe cryptosystem, systems that understand quantum-safe cryptography (e.g. upgraded systems) cannot ignore the extension because it contains information needed to use the quantum-safe cryptosystem.

In some cases, a private extension of an X.509 certificate, that includes one or more additional public keys and/or one or more additional signature values associated with one or more corresponding cryptosystems, may include an additional policy field for processing the additional information. In some cases, the policy filed includes a policy for processing the additional public keys or signatures in the X.509 certificate. In some cases, the policy field may be implemented as an opcode. In some examples, the opcode may be in the form of an array of bits (e.g. a bit field), a bit map, an integer, or other structure known to be used for an opcode field. A policy may identify which cryptosystems are to be used for generating a signature and/or verifying a signature. For example, the policy may identify one or more signatures to be generated using public keys associated with certain cryptosystems. In another example, the policy may identify one or more signatures corresponding to certain cryptosystems that must be validated to verify a certificate. In some cases, the policy provides a priority order for verifying the one or more signatures. In some cases, the policy may identify one signature that must be successfully validated, and further instruct that at least one or more additional signatures must also be validated to verify the certificate.

The nodes in the example communication system 100 include secure communication modules (e.g., a Virtual Private Network (VPN), secure web browsing, secure mail, etc.) or other types of system components that use the PKI for authentication and use the related cryptographic keys for identification (e.g., in a digital signature-based zero-knowledge proof or another type of identification mechanism) to establish the trusted identity of participating entities. The security of such authentication and identification mechanisms may rely on one or more cryptography systems ("cryptosystems"). Examples of crypto-systems include a variety of RSA-based cryptosystems, ECC-based cryptosystems, lattice-based cryptosystems and others. A cryptosystem typically defines a set of cryptographic protocols and parameters to be used in the cryptographic protocols.

Figure 2A:
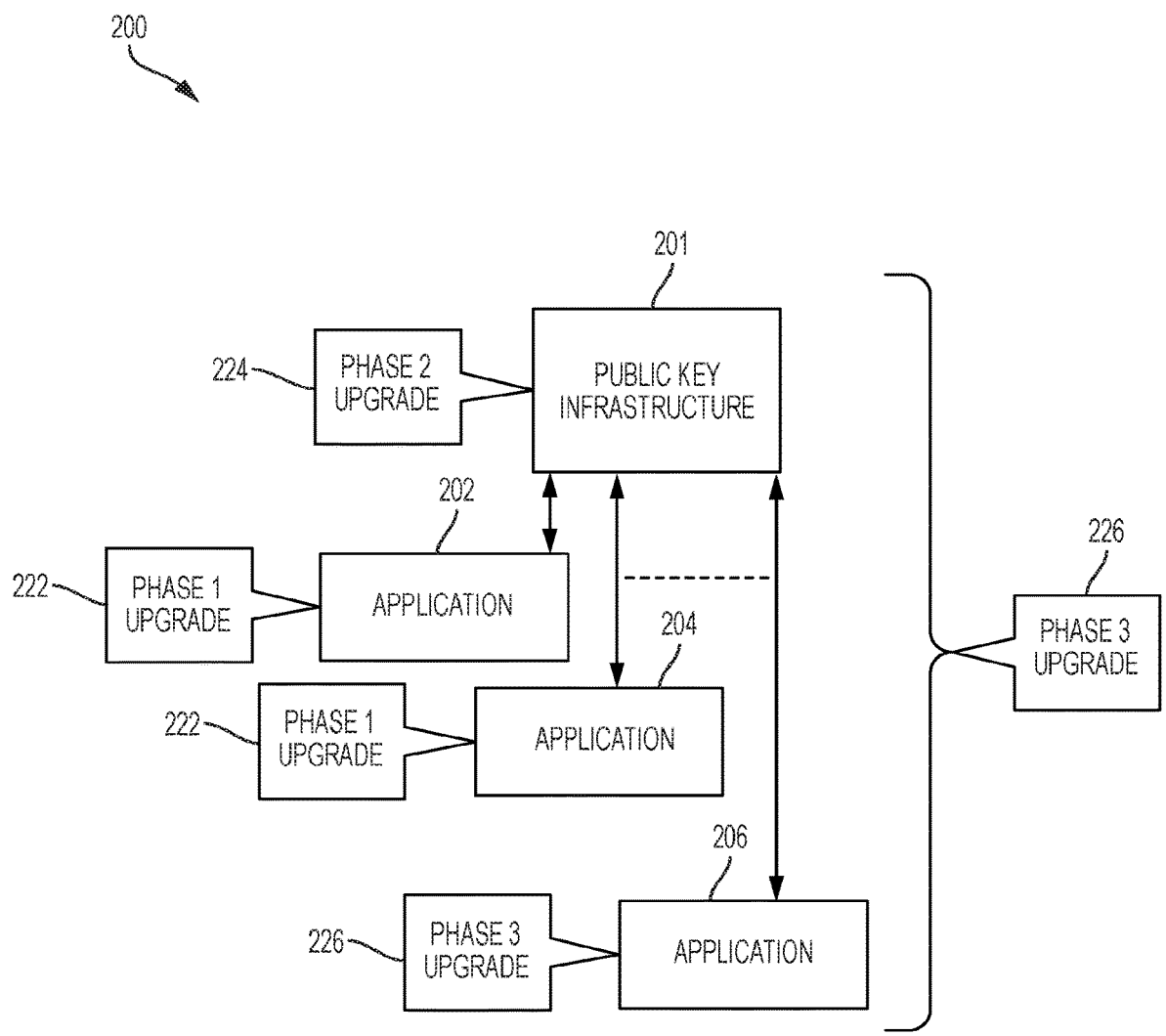
FIG. 2A is a block diagram showing an example enterprise system transitioning between cryptosystems.
Figure 2B:
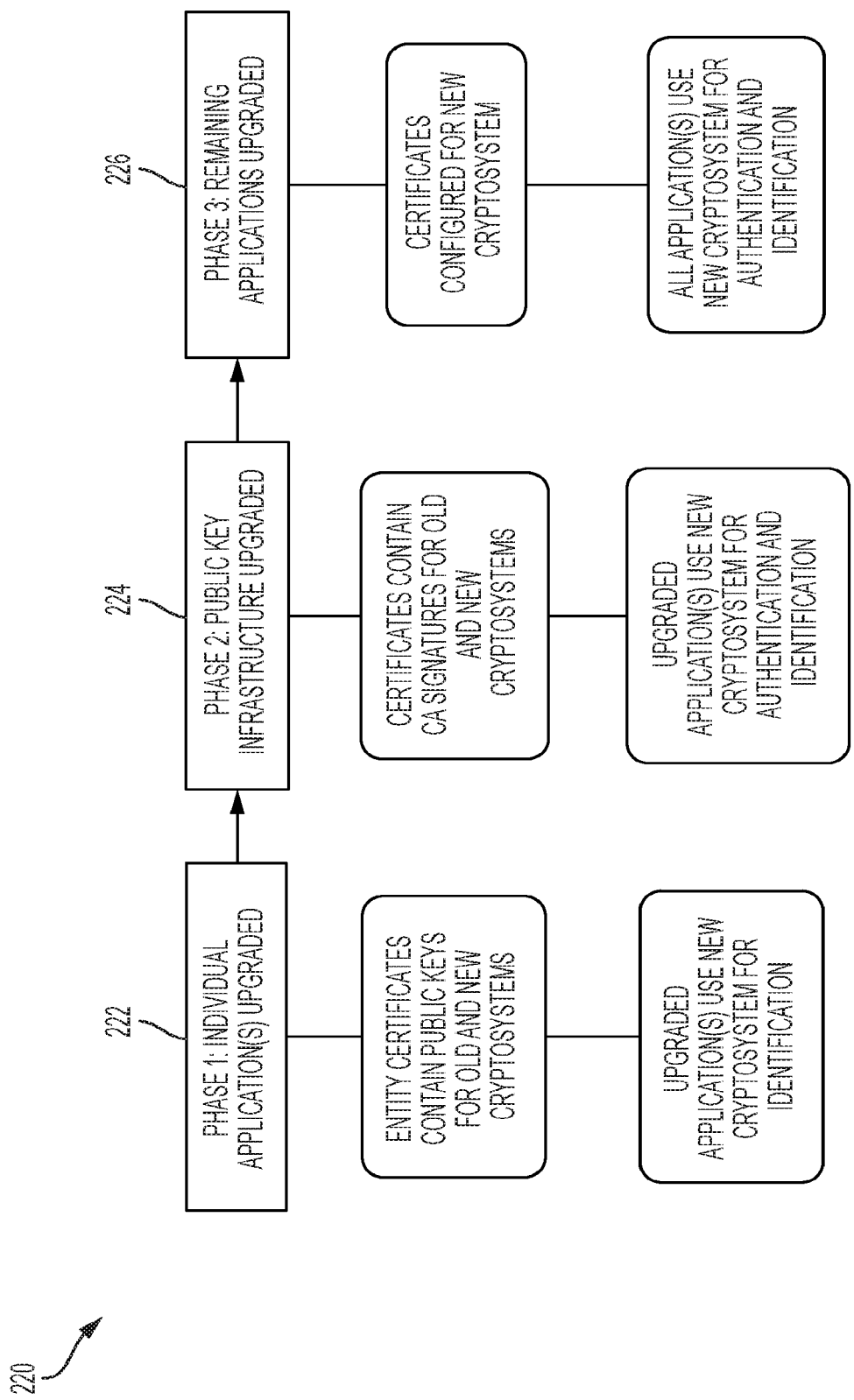
FIG. 2B is a flow diagram showing an example process for transitioning between cryptosystems.

In some instances, the communication system 100 can use multiple cryptosystems, for example, to provide an additional layer of security, to transition from one cryptosystem to another cryptosystem, to test a new cryptosystem or for another purpose. As an example, the communication system 100 may transition from relying on an ECC-based cryptosystem to relying on a lattice-based cryptosystem for security. As another example, the communication system 100 may transition from relying on one type of ECC-based cryptosystem to relying on another type of ECC-based cryptosystem for security. In some cases, multiple cryptosystems may be used when a legacy cryptosystem has been comprised and is no longer secure, and an updated cryptosystem is implemented to replace the legacy cryptosystem. Since the secure communication modules interface with other nodes in the communication system 100, the cryptosystems can be transitioned in phases. For example, the new cryptosystem can be introduced through one or more transition phases in which the new and old cryptosystems are both available. The transition phases can allow the new cryptosystem to be introduced without significant interruption in service. An example of a multi-phase transition is shown in FIGS. 2A and 2B; a cryptosystem may be transitioned in another manner.

In the example shown in FIG. 1, the communication system 100 can be transitioned from an initial cryptosystem to an upgraded cryptosystem, for example, when the initial cryptosystem is compromised and no longer secure. In some instances, the upgraded cryptosystem uses the same cryptographic protocols as the initial cryptosystem, and uses different parameters in those protocols. For example, an ECC-based cryptosystem can be upgraded to use a new elliptic curve that provides better security. In some instances, the upgraded cryptosystem uses different cryptographic protocols than the initial cryptosystem uses. For example, an ECC-based cryptosystem can be replaced by a lattice-based cryptosystem that provides better security.

In some cases, the communication system 100 is transitioned in a manner that allows the PKI to use a single digital certificate per user identity during the transition. For instance, a single digital certificate may be used with both the initial cryptosystem and the upgraded cryptosystem before, after and during the transition. Maintaining a single digital certificate per user identity can simplify the transition, for example, by reducing the resources needed for secure communication during the transition. For instance, some systems use physical solutions for credential storage which are limited in terms of space as well as limited in terms of ways to interact with them (e.g., for updates), and maintaining a single end-entity certificate can provide a simpler solution for upgrading such system components.

In some instances, the communication system 100 can use both a quantum-vulnerable cryptosystem and a quantum-resistant cryptosystem, for instance, while transitioning from the quantum-vulnerable cryptosystem to the quantum-resistant cryptosystem. For example, it is known that many conventional cryptosystems (e.g., some classic digital signature algorithms such as RSA, DSA, or ECDSA) can be vulnerable to attacks by a quantum computer, and upgrading to quantum-resistant cryptosystems may improve security. In some instances, the communication system 100 uses a conventional cryptosystem or other cryptosystem, e.g. a quantum-vulnerable cryptosystem and in the event the cryptosystem in use compromised and is no longer secure, the system may transition to a different or upgraded cryptosystem, which may be an upgraded or different conventional quantum-resistant cryptosystem or a quantum-resistant cryptosystem. In some implementations, the communication system 100 can be transitioned from the existing cryptosystem, e.g. a quantum-vulnerable cryptosystem, to an upgraded or different cryptosystem, e.g. quantum-resistant cryptosystem, using a phased migration. The phased migration can be designed to smoothly transition secure communication modules (e.g., a Virtual Private Network (VPN), secure web browsing, secure mail, etc.) or other types of system components from the quantum-vulnerable cryptosystem to the quantum-resistant cryptosystem.

In the example shown in FIG. 1, the example entity nodes 102, 104 and the certificate authority nodes 112, 114 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 111 and an interface 113. Each of the entity nodes 102, 104 and the certificate authority nodes 112, 114 may include the same, additional or different components. The entity nodes 102, 104 and the certificate authority nodes 112, 114 may be configured to operate as shown and described with respect to FIG. 1 or in another manner. In some cases, a single device may operate both as an entity node and as a certificate authority node.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 111. For example, the computer-readable instructions can be configured to perform one or more of the operations shown in FIGS. 3 and 4.

In the example node 102 shown in FIG. 1, the processor 111 can execute instructions, for example, to generate output data based on data inputs. For example, the processor 111 can run computer programs by executing or interpreting the software, scripts, programs, functions, executables, or other modules stored in the memory 110. In some instances, the processor 111 may perform one or more of the operations shown in FIGS. 3 and 4.

The example processor 111 shown in FIG. 1 can include one or more chips or chipsets that include analog circuitry, digital circuitry or a combination thereof. In some cases, the processor 111 includes multiple processor devices such as, for example, one or more main processors and one or more co-processors. For instance, the processor 111 may include a main processor that can delegate certain computational tasks to a cryptographic co-processor, which may be configured to perform the computational tasks more efficiently than the main processor or in parallel with other computational tasks performed by other processor devices. In some instances, the processor 111 coordinates or controls operation of other components of the node 102, such as, for example, user interfaces, communication interfaces, peripheral devices and possibly other components.

In the example node 102 shown in FIG. 1, the interface 113 provides communication with other nodes or devices. In some cases, the interface 113 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 113 includes a wired communication interface (e.g., USB, Ethernet) that can be connected to one or more input/output devices, such as, for example, a keyboard, a pointing device, a scanner, or a networking device such as a switch or router, for example, through a network adapter.

The example network 106 can include all or part of a connector, a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, lattice-based cryptosystems have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the network 106. For example, the quantum-enabled adversary 108 may access some or all of the information exchanged between the entity nodes 102, 104 or between an entity node and a certificate authority node. In some instances, the quantum-enabled adversary 108 can directly observe correspondence on the network 106; in some instances, the quantum-enabled adversary 108 indirectly obtains such correspondence, for example, by receiving information observed on the network 106 by another entity or system.

In some implementations, the quantum-enabled adversary 108 can factor integers, compute discrete logarithms or perform other classically-hard computational tasks fast enough to compromise the security of certain cryptography systems. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the entity nodes 102, 104 and the certificate authority nodes 112, 114 may use a quantum-resistant cryptosystem that cannot be compromised by the example quantum-enabled adversary 108. For instance, the entity nodes 102, 104 may communicate using a cryptosystem that is secure against a quantum computer that can efficiently execute Shor's algorithm or other types of algorithms that are known to compromise the security of certain conventional cryptography standards. In some instances, the quantum-resistant cryptosystem can be used in parallel with a quantum-vulnerable cryptosystem. For example, the communication system 100 may transition from using a quantum-vulnerable cryptosystem to using a quantum-resistant cryptosystem in one or more transition phases, and both cryptosystems can be available for use during a transition phase.

In some implementations, the nodes 102, 104 use a digital signature scheme that allows each node to verify the authenticity of messages received from the other node. In some implementations, the nodes 102, 104 use an encryption scheme that allows each node to send confidential messages to the other nodes. Such digital signature schemes and encryption schemes can include or be performed based on a digital certificate. In some example schemes, the entity nodes 102, 104 and the certificate authority nodes 112, 114 can use the example techniques shown in or described with respect to any one or more of FIGS. 2A to 12; or the entity nodes 102, 104 and the certificate authority nodes 112, 114 may use variations of these and other techniques to communicate in the network 106. In some instances, multiple digital signature schemes or multiple encryption schemes are used, for example, during a transition between cryptosystems.

In some implementations, the entity nodes 102, 104 and the certificate authority nodes 112, 114 use an elliptic curve cryptography (ECC) scheme in their communications over the network 106. In some ECC schemes, information is encoded in elliptic curve points in an elliptic curve group. An elliptic curve group can be described in terms of a solution to an equation over a finite field, for example, a prime finite field or a characteristic-two extension field. Each point in the elliptic curve group is a pair of field elements corresponding to a solution to an elliptic curve equation. A number of ECC digital signature algorithms have been standardized, for example, ECDSA (Elliptic Curve Digital Signature Algorithm), ECNR (Elliptic Curve Nyberg Rueppel), ECPVS (Elliptic Curve Pintsov Vanstone Signatures), ECQV (Elliptic Curve Qu Vanstone) and EdDSA (Edwards-curve Digital Signature Algorithm). Some ECC schemes are believed to be vulnerable to quantum attacks.

In some implementations, the entity nodes 102, 104 and the certificate authority nodes 112, 114 use a lattice-based cryptography scheme in their communications over the network 106. The security of lattice-based cryptography schemes is based on the apparent hardness of certain problems on point lattices in $\mathbb{R}_n$. Some lattice-based cryptography schemes are believed to be secure against quantum-enabled adversaries. For example, it is believed that no efficient quantum algorithms are known for the hard problems typically used in lattice-based cryptography. Examples of lattice-based cryptography techniques include ring-learning-with-errors-based (Ring-LWE) key agreement protocols, Ring-LWE encryption protocols, NTRU algorithms (e.g., NTRUEncrypt, NTRUSign, etc.), Bimodal Lattice Signature Schemes (BLISS), PASS algorithms (e.g., PASS-Sign, etc.), TESLA (Tightly-secure, Efficient signature scheme from Standard LAttices) protocols, ring-TESLA protocols, Dilithium, and others. Some lattice-based schemes are believed to be resistant to quantum attacks. Additional types of quantum-safe digital signature schemes may be used, including Stateful (LMS and XMSS) and stateless (e.g. SPHINCS family) hash-bashed signatures, as well as, multivariate signature schemes, including Rainbow.

FIG. 2A is a block diagram showing example enterprise system 200 transitioning between cryptosystems. The example enterprise system 200 shown in FIG. 2A includes a public key infrastructure (PKI) 201 and applications 202, 204, 206. The enterprise system 200 shown in FIG. 2A is transitioned according to an example transition process 220. In some implementations, the example transition process 220 can be used to fully upgrade an enterprise infrastructure in a manner that reduces or eliminates interruptions. FIG. 2B is a flow diagram showing the example transition process 220 that is used in FIG. 2A for transitioning between cryptosystems. Another type of transition process may be used in some cases.

Components of the enterprise system 200 shown in FIG. 2A may be implemented in the example communication system 100 shown in FIG. 1 or in another type of system. For example, each of the applications 202, 204, 206 can be executed on the entities nodes 102, 104 and certificate authority nodes 112, 114. The applications 202, 204, 206 can include various secure communication modules that use the public key infrastructure 201. As an example, the application 202 can be a Virtual Private Network (VPN) application, the application 204 can be a secure web browsing application, and the application 206 can be a secure mail application. The applications in the enterprise system 200 may include additional or different types of software applications.

FIG. 2A shows three phases in the example transition process 220—phase 1 upgrade 222, phase 2 upgrade 224 and phase 3 upgrade 226. Certain aspects of each phase are shown in FIG. 2B. In the example shown, a different type of digital certificate is used during each of the three phases. A transition process may include fewer, additional or different phases. For instance, two or more of the phases can be combined into a single phase, or a phase can be divided into multiple phases. As an example, the phase 1 upgrade 222 and phase 2 upgrade 224 may be performed together as a single phase of the transition process 220, or the phase 1 upgrade 222 may be omitted and the transition process 220 can begin with the phase 2 upgrade 224.

In the example shown in FIGS. 2A and 2B, the enterprise system 200 is upgraded from an old cryptosystem to a new cryptosystem. As an example, the old cryptosystem can be a quantum-vulnerable cryptosystem and the new cryptosystem can be a quantum-resistant cryptosystem. Generally, a cryptosystem defines a set of protocols and a set of parameters. The set of protocols defined by a cryptosystem typically include the steps performed by each entity, for instance, in a signature algorithm or encryption algorithm. The set of parameters defined by a cryptosystem typically include the values or ranges of values used in the protocols.

Upgrading a cryptosystem may include changing a set of protocols, changing a set of parameters or both. In some examples, system components can be upgraded from a cryptosystem that uses a first set of parameters (e.g. a first elliptic curve group, etc.) in a set of protocols, to another cryptosystem that uses a second set of parameters (e.g. a different elliptic curve group, etc.) in the same set of protocols. In some examples, the system components can be upgraded from a cryptosystem that uses a set of parameters in a first set of protocols (e.g. a first signature algorithm, etc.), to another cryptosystem that uses the same parameters in a second set of protocols (e.g. a different signature algorithm, etc.). In some examples, the system components can be upgraded from a cryptosystem that uses a first set of parameters and protocols to another cryptosystem that uses a different set of parameters and protocols (e.g., upgrading from an ECC-based cryptosystem to a lattice-based cryptosystem). As an example, the transition process 220 shown in FIG. 2B can be used to migrate between any two types of digital signature schemes (e.g., from a quantum-vulnerable digital signature scheme to a quantum-resistant digital signature scheme).

As shown in FIG. 2B, the phase 1 upgrade 222 is applied to one or more individual applications. In the example shown in FIG. 2A, the phase 1 upgrade 222 is applied to the application 202 and the application 204; and the phase 1 upgrade 222 is not applied to the application 206. As shown in FIG. 2B, when the phase 1 upgrade 222 has been applied, entity certificates for upgraded applications contain public keys for the old and new cryptosystems, and the upgraded applications use the new cryptosystem for identification (e.g., using a digital signature process, an encryption process, or another identification mechanism). Non-upgraded applications continue using the old cryptosystem for identification. In some cases, entity certificates that contain old and new cryptosystem information, e.g. old and new public keys, include a policy for processing the old and new cryptosystem information in the entity certificate. Upgraded applications, e.g. 202, 204, understand the new cryptosystem, and therefore, use the instructions in the policy for handling the new and the old public keys, e.g. during an identification process. On the other hand, non-upgraded applications, e.g. application 206, are not aware of the new cryptosystem and therefore, may ignore the policy when processing digital certificates that include new cryptosystem information.

As an example, when the phase 1 upgrade 222 is applied to an enterprise system, a VPN application can be upgraded throughout the enterprise system (e.g., on all enterprise nodes), while other applications (e.g., a secure web browser application) are not upgraded. After the phase 1 upgrade 222, the VPN application can use the new (e.g., quantum-resistant) cryptosystem for handshake challenges (e.g., between client and server) and use the old (e.g., quantum-vulnerable) cryptosystem to verify certificate chains. In some examples, an upgraded VPN application can use a private key associated with the new cryptosystem to sign handshake challenges, while other applications continue to use the private key associated with the old cryptosystem to sign handshake challenges. In some cases, an upgraded VPN application can use digital certificates that each include two public keys—one for the old cryptosystem and one for the new cryptosystem. For example, the upgraded VPN application can use the example digital certificate 502 shown in FIG. 5 or another digital certificate. In some examples, the public key associated with the new cryptosystem is inserted in an extension of a digital certificate for an upgraded application, while the public key and certificate signature associated with the old cryptosystem reside in the basic public key and signature value fields, respectively. To request a digital certificate for an upgraded application, a certificate signing request (CSR) can be created, for example, as described with respect to FIG. 5. In some cases, the digital certificate for an upgraded VPN application may include a policy that provides instructions to the upgraded application for using the old and new cryptosystems to perform handshake challenges and verify certificate chains. In some instances, a policy that includes instructions for using the new cryptosystem and the old cryptosystem is inserted in the extensions of the digital certificate for the updated application by the issuing certificate authority (CA) in response to the CSR.

In some implementations, after the phase 1 upgrade 222, a certificate authority may not recognize the public key associated with the new cryptosystem, and this may be acceptable, for example, since the security of the PKI still relies on the public key associated with the old cryptosystem before the phase 2 upgrade 224.

As shown in FIG. 2B, the phase 2 upgrade 224 is applied to the public key infrastructure. In the example shown in FIG. 2A, the phase 2 upgrade 224 is applied to the public key infrastructure 201. As shown in FIG. 2B, when the phase 2 upgrade 224 has been applied, entity certificates and CA certificates contain certificate authority signatures for the old and new cryptosystems, and the upgraded applications (i.e., the applications upgraded in the phase 1 upgrade 222) use the new cryptosystem, and in some cases, also uses the old cryptosystem (e.g. according to the processing rules in the policy) for identification and authentication. The other applications (i.e., the applications not upgraded in the phase 1 upgrade 222) continue using the old cryptosystem for identification and authentication. For example, because the other applications do not have knowledge of the new cryptosystem, the new cryptosystem and the policy in the entity and CA certificates will be ignored.

In some implementations, after the phase 2 upgrade 224, all available cryptographic keys and digital signatures may be used by the relying protocols. In some instances, an authentication process can be performed without modifying the relying protocols, and an identification process may require protocol modification. In some instances, an authentication process may also require protocol modification.

Continuing the example above (where the phase 1 upgrade 222 was applied to the VPN application), when the phase 2 upgrade 224 is applied to the enterprise system, the public key infrastructure is upgraded throughout the enterprise system (e.g., on all enterprise nodes), while some individual applications (e.g., a secure web browser application) have not been upgraded. After the phase 2 upgrade 224, the VPN application can use the new (e.g., quantum-resistant) cryptosystem for handshake challenges (e.g., between client and server) and to verify certificate chains. In some examples, an upgraded VPN application can use a certificate authority signature associated with the new cryptosystem to verify certificate chains, while other applications continue to use the certificate authority signature associated with the old cryptosystem to verify certificate chains. After the phase 2 upgrade 224, an upgraded VPN application can use digital certificates that each include two public keys and two certificate authority signatures—one for the old cryptosystem and one for the new cryptosystem. For example, the upgraded VPN application can use the example digital certificate 902 shown in FIG. 9 or another digital certificate. In some examples, the public key and certificate authority signature associated with the new cryptosystem are both inserted in an extension of a digital certificate for an upgraded application, while the public key and certificate signature associated with the old cryptosystem reside in the basic public key and signature value fields, respectively. In some cases, an upgraded VPN application may use a combination of the new and the old cryptosystem for challenges or to verify certificate chains according to a policy that provides instructions for processing the different cryptosystems. In some instances, there may be more than two supported cryptosystems, e.g. a third cryptosystem, a fourth cryptosystem, etc.

Figure 3:
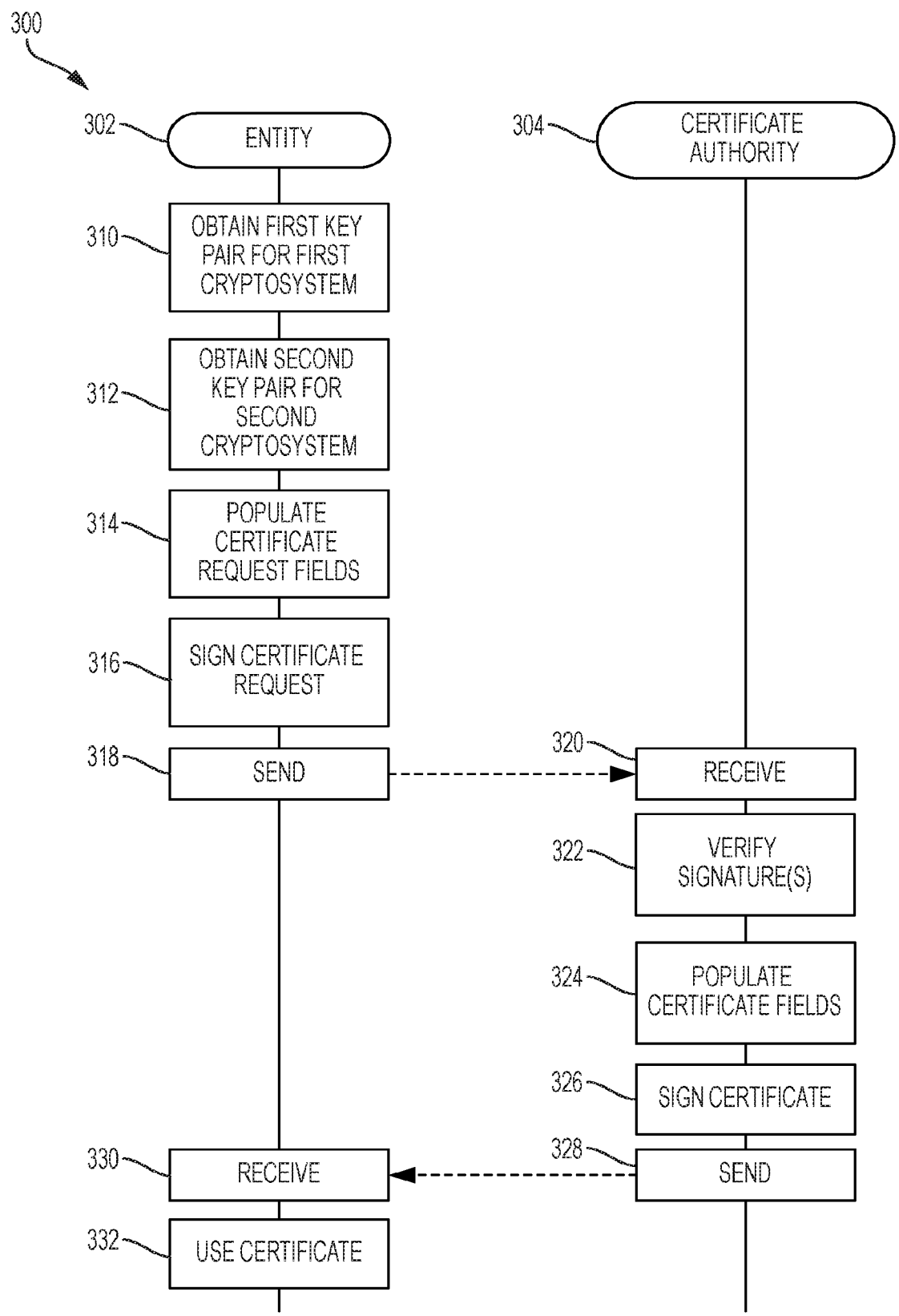
FIG. 3 is a flow diagram showing an example process for issuing a digital certificate for multiple cryptosystems.

To request a digital certificate for an upgraded application after the PKI has been upgraded, a certificate signing request (CSR) can be created, for example, according to the example certificate signing request described with respect to FIG. 3. After the phase 2 upgrade 224, certificate authorities are capable of executing protocols for the new cryptosystem. Therefore, when requesting a certificate, the end entities provide their digital signatures associated with the old and new cryptosystems. The certificate authority can then verify that the end-entity possesses the private keys associated with both the old and new cryptosystems.

In some implementations, after the PKI has been upgraded, a digital certificate for an upgraded application is generated by a certificate authority in response to a certificate signing request (CSR). In some examples, the certificate authority first signs the digital certificate using its private key for the new cryptosystem and places the signature in a private extension; and the certificate authority then signs the digital certificate using its private key for the old cryptosystem and places the signature in the basic signature value field. In such examples, the order of the signature layering can ensure that applications that have not been upgraded (in the phase 1 upgrade 222) can continue operating as they did before the PKI upgrade (in the phase 2 upgrade 224) to verify certificate signatures. For instance, the non-upgraded applications can hash the entire certificate, including all extensions, when computing the certificate hash for certificate signature verification, while the upgraded applications can exclude the basic signature value field when calculating the certificate hash before verifying the certificate authority signature associated with the new cryptosystem. In some implementations, a policy provides instructions to an upgraded application for verification of the certificate authority signatures for the new and old cryptosystem. For example, the policy may instruct an upgraded application to verify one or more certificate authority signatures, e.g. a signature in the basic signature field and one or more signatures in the extensions, and in some cases, may indicate a priority order for verifying the signatures. In some implementations, the policy is included as an extension. In some cases, the policy is included as part of the extension containing the certificate authority signature associated with the new cryptosystem or, in some instances, is a separate private extension or other non-critical field of the digital certificate, As shown in FIG. 2B, the phase 3 upgrade 226 is applied to the remaining applications that were not upgraded during the phase 1 upgrade 222. In the example shown in FIG. 2A, the phase 3 upgrade 226 is applied to the application 206, since the other applications 202, 204 were previously upgraded during the phase 1 upgrade 222. As shown in FIG. 2B, when the phase 3 upgrade 226 has been applied, entity certificates and CA certificates are all configured for the new cryptosystem, and all applications use the new cryptosystem for identification and for authentication.

In some implementations, after the phase 3 upgrade 226 has been applied in an enterprise system, there is no longer a need for hybrid certificates in the enterprise system. The data objects (e.g., public keys and certificate authority signatures) associated with the new cryptosystem can be placed in the basic public key and signature value fields of the digital certificates, and the private extensions, including any policy for managing hybrid digital certificates, can be dropped or ignored. When the hybrid certificates have been replaced, a security policy can be used to turn off hybrid certificate support in the enterprise system.

In some implementations, after the phase 3 upgrade 226 has been applied in an enterprise system, the public keys and signatures associated with the new cryptosystem remain in the private extensions of the digital certificates. In some implementations, after the phase 3 upgrade 226 has been applied in an enterprise system, the public keys and signatures associated with the old cryptosystem are moved to the private extensions of the digital certificates. Retaining the public keys and signatures associated with the old cryptosystem may be useful, for example, in the case of a secure email application that uses S/MIME. For instance, an unexpired entity certificate may be meant to authenticate messages signed by that entity until that certificate expires. If a user certificate is re-issued with a new public key, the old public key can also be included so user messages signed by the matching (old) private key can still be authenticated. In such cases, the old public key can be linked to their original expiry date.

In some implementations, the example transition process 220 can accommodate a scenario where end entities and certificate authorities use different digital signature algorithms. For example, hash based digital signature algorithms (such as, e.g., Leighton Micali Signatures or XMSS) may be used by certificate authorities to sign digital certificates, while end entities may use another type of digital signature algorithm to sign messages.

In some implementations, the public key infrastructure 201 uses X.509 certificates, and the data objects (e.g., public keys, certificate authority signatures) associated with the new cryptosystem are inserted in the private extension of the X.509 certificates. In such cases, system components that are unaware of the upgrades can ignore the private extension, such that the data objects associated with the new cryptosystem do not impact the operation of such system components.

FIG. 3 is a flow diagram showing an example process 300 for issuing a digital certificate for multiple cryptosystems. The example process 300 can be performed, for example, by computer systems that can exchange information over a network. For instance, operations in the process 300 may be performed by either of the entity nodes (102 or 104) and either of the certificate authority nodes (112 or 114) in the example communication system 100 shown in FIG. 1 or in another type of system.

The example process 300 shown in FIG. 3 includes operations performed by an entity 302 and a certificate authority 304. In the example shown, the entity 302 and the certificate authority 304 represent two distinct entities in a public key infrastructure (PKI). The certificate authority 304 can be, for example, a root certificate authority or a subordinate certificate authority. The entity 302 can be a subordinate certificate authority or any other type of entity in a PKI (e.g., user, user account, device or machine, software module or other types of entity). In the example shown in FIG. 3, the certificate authority 304 issues a digital certificate to the entity 302. The digital certificate issued in the process 300 can be, for example, an end-entity certificate or a CA certificate.

In some implementations, the example process 300 is used to issue a digital certificate that includes data objects (e.g., a public key, a certificate authority signature, etc.) for a first cryptosystem and data objects (e.g., a public key, a certificate authority signature, etc.) for a second, different cryptosystem. For example, the example process 300 may be used to issue one or more of the digital certificates shown in FIG. 5, 6, 7, 8, 9 or 10, or another type of digital certificate. The digital certificate issued in the example process 300 may be a hybrid digital certificate that is used during one or more phases of transition between the first and second cryptosystems. For instance, the digital certificate issued in the example process 300 may be used by one or more of the example system components shown in FIG. 2A after the phase 1 upgrade 222, the phase 2 upgrade 224 or another type of transition phase. In some examples, the first cryptosystem is a quantum-vulnerable cryptosystem and the second cryptosystem is a quantum-resistant cryptosystem. In some implementations, the hybrid digital certificate may comprise data objects (e.g., a public key, a certificate authority signature, etc.) for additional cryptosystems, e.g. a third, fourth, etc. cryptosystem, and the transition may occur between the second and third cryptosystem, or the third and fourth cryptosystem, etc.

The example process 300 may include additional or different operations, including operations performed by additional or different entities, and the operations may be performed in the order shown or in another order. In some cases, one or more of the operations shown in FIG. 3 are implemented as processes that include multiple operations, sub-processes or other types of routines. In some cases, operations can be combined, performed in parallel, iterated or otherwise repeated or performed another manner.

In some examples, one or more aspects of the process 300 are secure against quantum-enabled adversaries such as, for example, the quantum-enabled adversary 108 shown in FIG. 1. For instance, in some cases, the example process 300 is secure against certain types of attacks or other processes that can be performed by a quantum-enabled adversary who has access to public information exchanged between the entity 302 and the certificate authority 304. In some examples, one or more aspects of the process 300 are secure against classically-enabled adversaries who do not have access to quantum computers or other quantum resources.

At 310, the entity 302 obtains a first key pair (a first private key and a first public key) associated with the first cryptosystem. At 312, the entity 302 obtains a second key pair (a second private key and a second public key) associated with the second cryptosystem. As an example, the entity 302 may obtain a key pair associated with an ECC-based cryptosystem at 310, and the entity 302 may obtain a key pair associated with a lattice-based cryptosystem at 312. The key pairs may be obtained, for example, by retrieving them from memory or from a remote device, or the key pairs may be obtained by executing a key derivation protocol or another type of process.

At 314, the entity 302 populates the fields of a certificate request. The certificate request can be, for example, a certificate signing request (CSR) or another type of certificate request. For instance, the entity 302 may generate a CSR of the type shown in FIG. 5, 7 or 9, or the entity 302 may generate another type of CSR. In some cases, the CSR includes a public key for one or more additional cryptosystems in the extension of the certificate request. In an example, the certificate request includes a first public key associated with a first cryptosystem and a second public key associated with a second cryptosystem. The first public key can be included in the public key field of the certificate request, and the second public key can be included in an extension of the certificate request. The public keys may be included in the certificate request in another manner. In some cases, the certificate request does not include the second public key associated with the second cryptosystem. In some implementations, the entity requesting the digital certificate includes in the certificate request a policy with instructions for processing the data objects for the first and second cryptosystems, e.g. which may be used by a peer end-entity to verify a digital signature of the certificate owner or for an encryption/decryption process.

Figure 5:
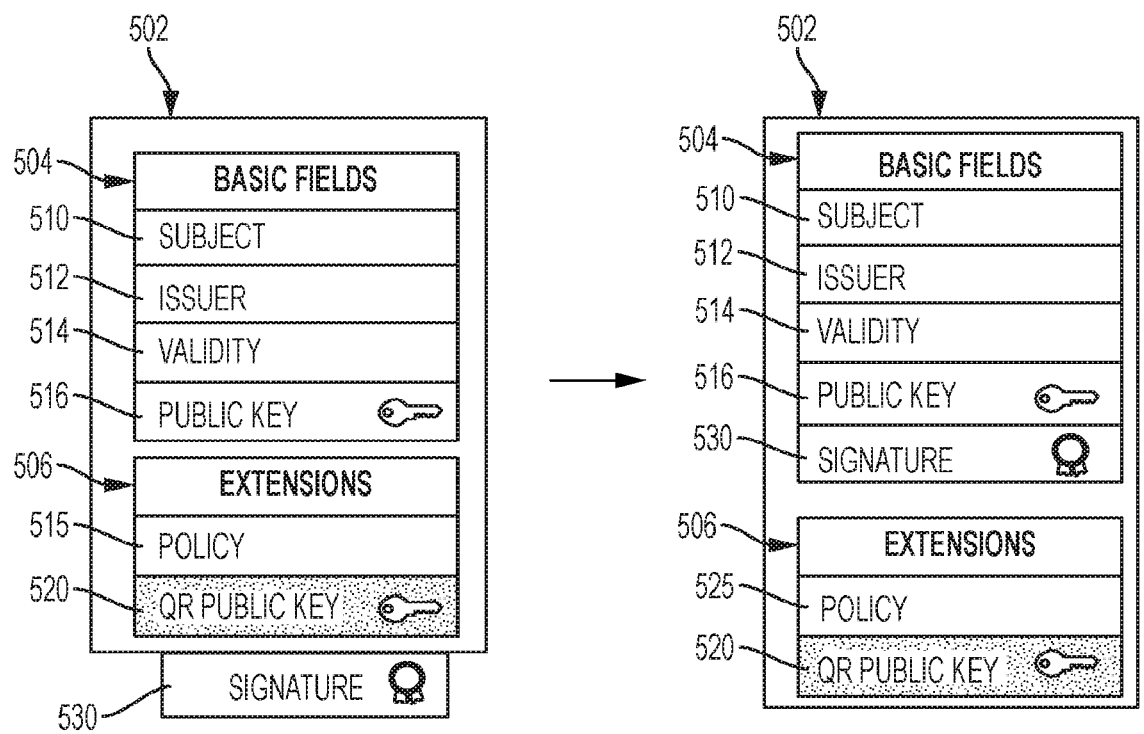
FIG. 5 is a block diagram showing an example digital certificate that includes a public key for a quantum-resistant cryptosystem.
Figure 7:
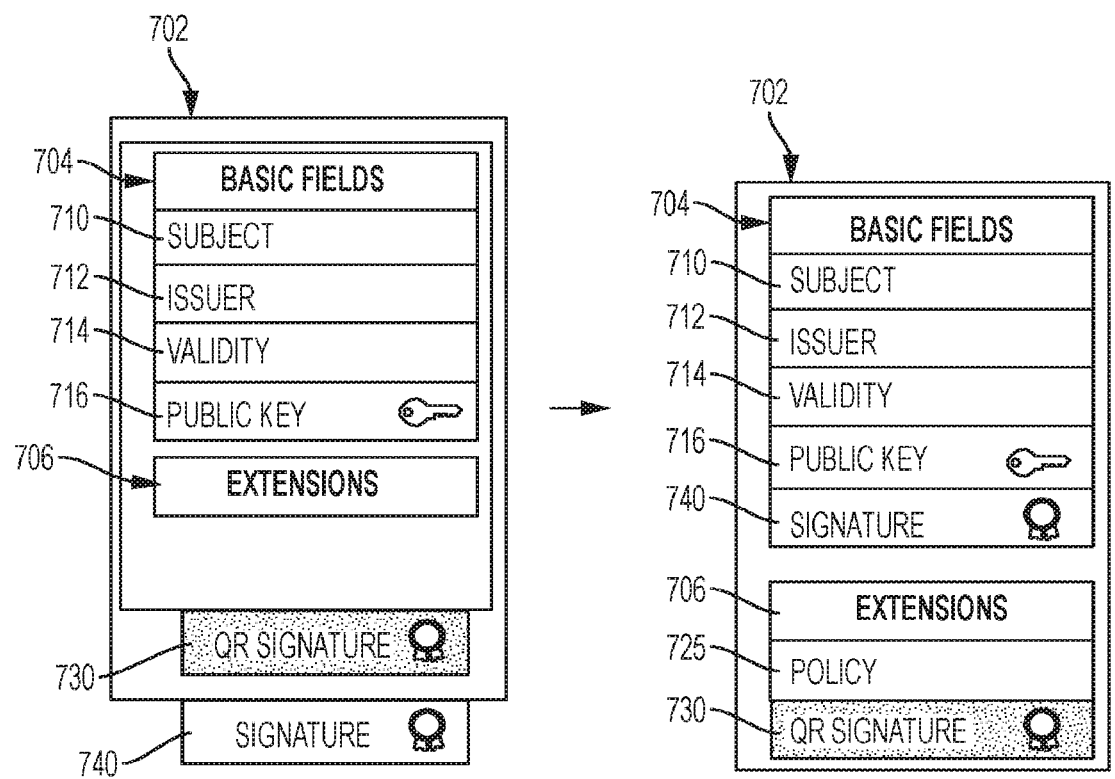
FIG. 7 is a block diagram showing an example digital certificate that includes a certificate authority signature for a quantum-resistant cryptosystem.
Figure 9:
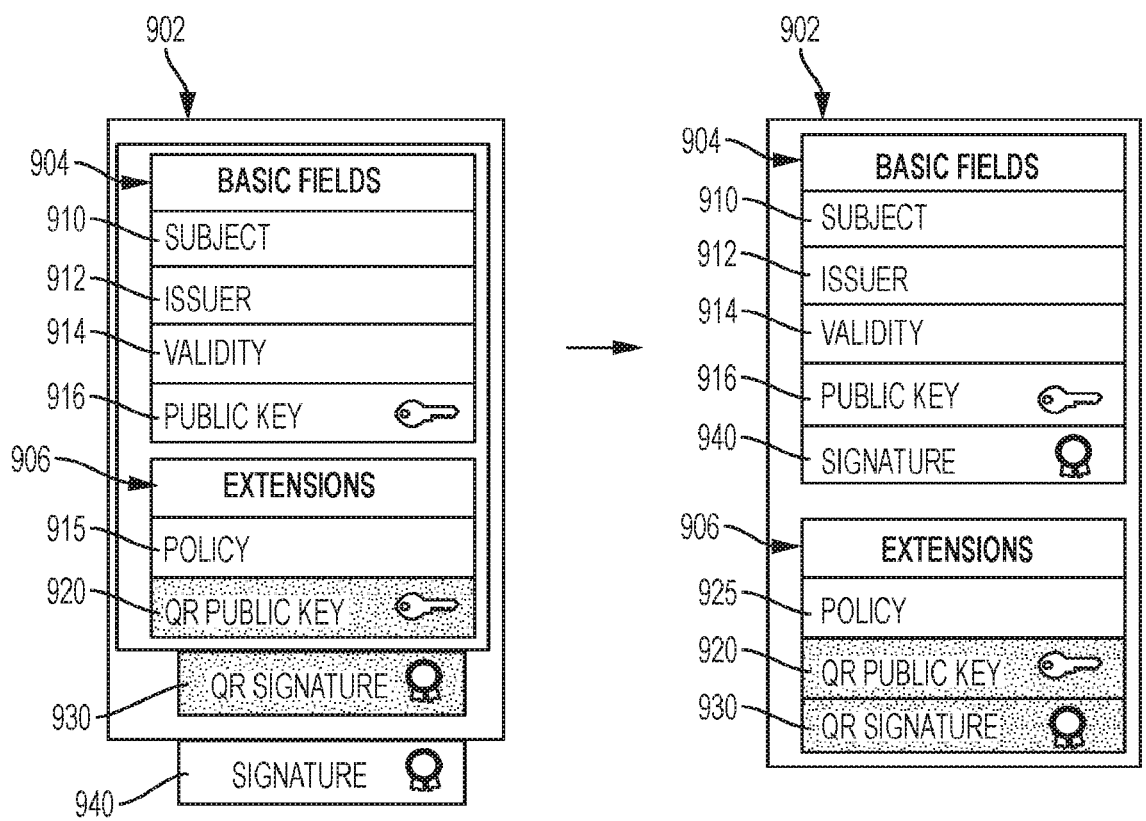
FIG. 9 is a block diagram showing an example digital certificate that includes a certificate authority signature and public key for a quantum-resistant cryptosystem.

At 316, the entity 302 signs the certificate request. In some implementations, a single digital signature is applied to the certificate request, for example, as shown in FIG. 5 or FIG. 7. For instance, the entity 302 may generate the certificate request signature using the first private key and a digital signature algorithm associated with the first cryptosystem. In some implementations, multiple digital signatures are applied to the certificate request, for example, as shown in FIG. 9. For instance, the entity 302 may generate a second certificate request signature using the second private key and a digital signature algorithm associated with the second cryptosystem. The second digital signature may be applied before the first digital signature is applied in some cases. In some implementations, additional signatures may be generated using another private key and a digital signature algorithm associated with another cryptosystem, e.g. a third or fourth cryptosystem, etc.

At 318, the entity 302 sends the certificate request to the certificate authority 304; and at 320, the certificate authority 304 receives the certificate request from the entity 302. In the example shown in FIG. 3, the entity 302 may send information directly to the certificate authority 304, or the entity 302 may initiate transmission indirectly, for example, through a server. All or part of the information can be transmitted over a public channel, and may be observed by a quantum-enabled adversary or another type of adversary.

At 322, the certificate authority 304 verifies the one or more signatures on the certificate request. When the certificate request includes a single certificate request signature, the certificate authority 304 can verify the certificate request signature using the first public key of the entity 302 and the digital signature algorithm associated with the first cryptosystem. When the certificate request also includes a second certificate request signature, the certificate authority 304 can verify the second certificate request signature using the second public key of the entity and the digital signature algorithm associated with the second cryptosystem.

At 324, the certificate authority 304 populates fields of a digital certificate. For instance, the certificate authority 304 may generate a digital certificate of the type shown in FIG. 5, 7 or 9, or the certificate authority 304 may generate another type of digital certificate. In some cases, the digital certificate is generated with one or more pre-populated fields, for example, based on the certificate request or other data objects. The digital certificate may be generated with one or more unpopulated fields, and the certificate authority 304 can then populate the fields of the digital certificate. In some cases, the digital certificate includes the first public key associated with the first cryptosystem and the second public key associated with the second cryptosystem. The certificate authority 304 can populate a public key field of the digital certificate with first public key of the entity, and certificate authority 304 can populate an extension of the digital certificate with the second public key of the entity. In some cases, additional public keys associated with additional cryptosystems (e.g. a third public key associated with a third cryptosystem, etc.) that may be included in the CSR are populated in the extension by the certificate authority 304. The public keys may be included in the digital certificate in another manner. In some implementations, the certificate authority 304 populates a policy field in the digital certificate. In some instances, the policy is included in the extension with the additional public keys and/or signatures. In some cases, the policy may be included in the digital certificate in another manner, for example, in a separate private extension or other non-critical field of the digital certificate. In some cases, the certificate authority may populate the digital certificate with the policy from the CSR. In some cases, the CSR does not include a policy, but the certificate authority may retrieve a policy on behalf of the requesting entity and populate the policy field in the extension with the retrieved policy. In some implementations, the certificate authority may have its own instructions for processing data objects, e.g. first and second certificate authority signatures, and may include a corresponding policy in the policy field in the extension. In some cases, the policy populated in the digital certificate includes a combination of instructions, e.g. for an upgraded end-entity and/or upgraded certificate authority.

At 326, the certificate authority 304 signs the digital certificate. In some implementations, a single digital signature is applied to the digital certificate, for example, as shown in FIG. 5. For instance, the certificate authority 304 may generate a digital signature using a first certificate authority private key, which is associated with the first cryptosystem. In some implementations, multiple digital signatures are applied to the digital certificate, for example, as shown in FIG. 7 or FIG. 9. For instance, the certificate authority 304 may generate a second digital signature using a second certificate authority private key, which is associated with the second cryptosystem (e.g., before applying the first digital signature using the first certificate authority private key). The first digital signature can be included in the signature value field of the digital certificate, and the second digital signature can be included in an extension of the digital certificate. In some cases, the certificate authority may generate additional digital signatures using a private key for other supported cryptosystems.

In some implementations, at 326, the certificate authority 304 uses the first certificate authority private key to generate the first digital signature, and the first digital signature is generated from a version of the digital certificate that has the first public key in the public key field and the second public key in the extension. The first digital signature may be generated from a version of the digital certificate that does not contain a second digital signature (e.g., in the examples shown in FIG. 5). The certificate authority 304 can then populate the signature value field of the digital certificate with the first digital signature.

In some implementations, at 326, the certificate authority 304 uses the second certificate authority private key to generate the second digital signature, and the second digital signature is generated from a version of the digital certificate that has the first public key in the public key field. The second digital signature may be generated from a version of the digital certificate that contains neither a second public key nor the first digital signature (e.g., in the example shown in FIG. 7). The certificate authority 304 can then populate the extension of the digital certificate with the second digital signature, and use the first certificate authority private key to generate the first digital signature. In this case, the first digital signature is generated from a version of the digital certificate that has the first public key in the public key field and the second digital signature in the extension, and the certificate authority 304 can then populate the signature value field of the digital certificate with the first digital signature.

In some implementations, at 326, the certificate authority 304 uses the second certificate authority private key to generate the second digital signature, and the second digital signature is generated from a version of the digital certificate that has the first public key in the public key field and the second public key in the extension. The certificate authority 304 can then populate the extension of the digital certificate with the second digital signature, and use the first certificate authority private key to generate the first digital signature. In this case, the first digital signature is generated from a version of the digital certificate that has the first public key in the public key field, the second public key in the extension and the second digital signature in the extension (e.g., in the example shown in FIG. 9). The certificate authority 304 can then populate the signature value field of the digital certificate with the first digital signature.

At 328, the certificate authority 304 sends the digital certificate to the entity 302; and at 330, the entity 302 receives the digital certificate from the certificate authority 304. At 332, the entity 302 uses the digital certificate. For example, the entity 302 may use the digital certificate as the certified entity 402 shown in FIG. 4 or in another manner.

Figure 4:
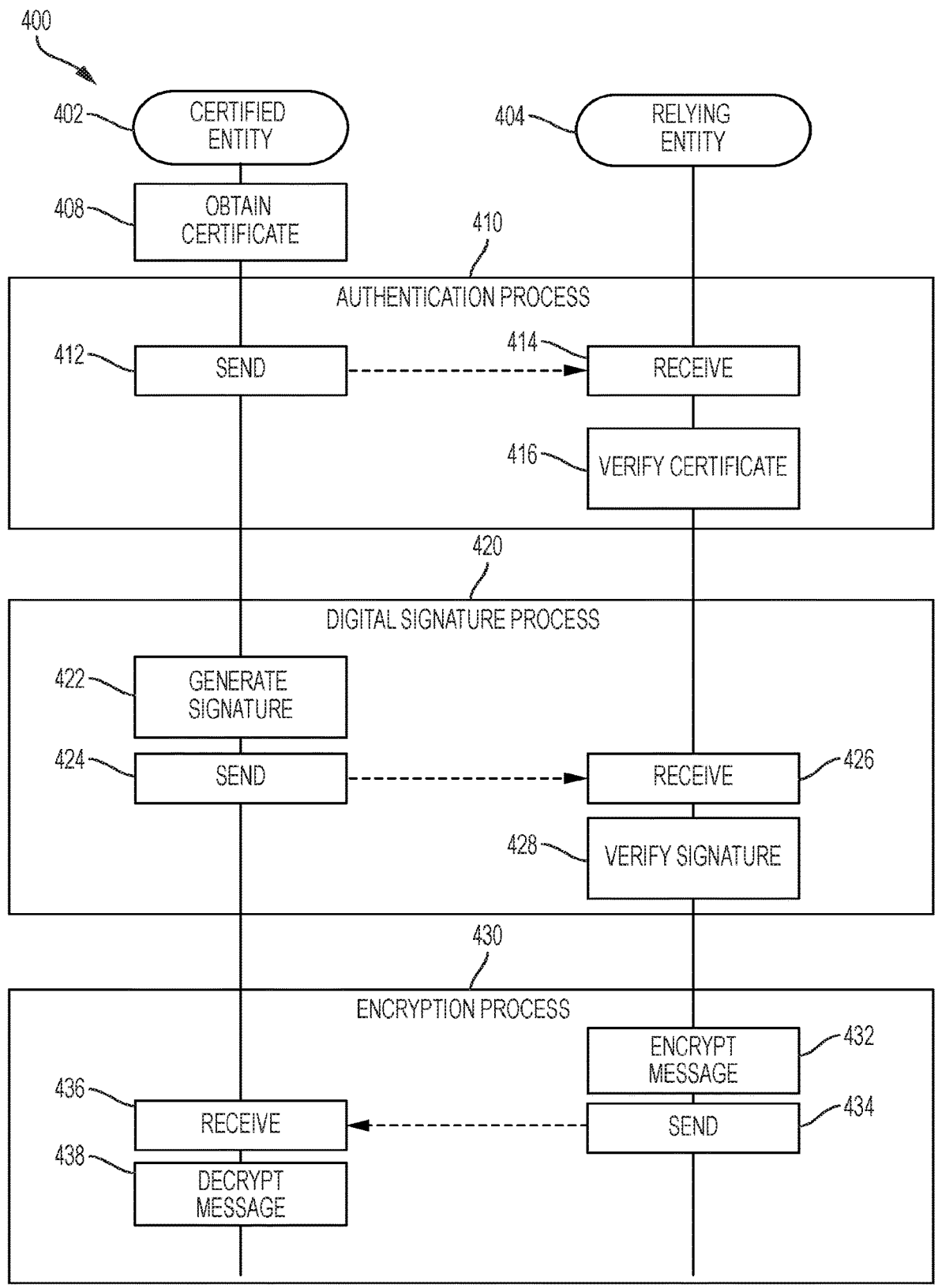
FIG. 4 is a flow diagram showing an example process for using a digital certificate in multiple cryptosystems.

FIG. 4 is a flow diagram showing an example process 400 for using a digital certificate with multiple cryptosystems. The example process 400 can be performed, for example, by computer systems that can exchange information over a network. For instance, operations in the process 400 may be performed by any of the nodes (e.g., the entity nodes 102, 104) in the example communication system 100 shown in FIG. 1 or in another type of system.

The example process 400 shown in FIG. 4 includes operations performed by a certified entity 402 and a relying entity 404. In the example shown, the certified entity 402 and the relying entity 404 represent two distinct entities in a public key infrastructure (PKI); they can be any type of entity in a PKI (e.g., users, user accounts, devices or machines, software modules or other types of entities). For example, the relying entity 404 can be a server and the certified entity 402 can be a client that is served by the server, or vice versa. As another example, the certified entity 402 and the relying entity 404 can be peers in a network.

The example process 400 uses a digital certificate that includes data objects (e.g., a public key, a certificate authority signature, etc.) for a first cryptosystem and data objects (e.g., a public key, a certificate authority signature, etc.) for a second, different cryptosystem. In some examples, the first cryptosystem is a quantum-vulnerable cryptosystem and the second cryptosystem is a quantum-resistant cryptosystem. The digital certificate used in the process 400 shown in FIG. 4 can be, for example, the digital certificate issued in the process 300 shown in FIG. 3, one or more of the digital certificates shown in FIG. 5, 6, 7, 8, 9 or 10, or another type of digital certificate. The example process 400 may use a hybrid digital certificate, for example, during one or more phases of transition between the first and second cryptosystems (e.g., after the phase 1 upgrade 222 or the phase 2 upgrade 224 shown in FIGS. 2A and 2B). In some cases, the hybrid digital certificate includes a policy with instructions for handling the data objects for the first cryptosystem and the data objects for the second cryptosystem. In some cases, the digital certificate may include data objects for additional cryptosystems supported by the particular entity (e.g. a third cryptosystem, etc.).

The example process 400 may include additional or different operations, including operations performed by additional or different entities, and the operations may be performed in the order shown or in another order. In some cases, one or more of the operations shown in FIG. 4 are implemented as processes that include multiple operations, sub-processes or other types of routines. In some cases, operations can be combined, performed in parallel, iterated or otherwise repeated or performed another manner.

In some examples, one or more aspects of the process 400 are secure against quantum-enabled adversaries such as, for example, the quantum-enabled adversary 108 shown in FIG. 1. For instance, in some cases, the example process 400 is secure against certain types of attacks or other processes that can be performed by a quantum-enabled adversary who has access to public information exchanged between the certified entity 402 and the relying entity 404. In some examples, one or more aspects of the process 400 are secure against classically-enabled adversaries who do not have access to quantum computers or other quantum resources.

At 408, the certified entity 402 obtains a digital certificate. For example, the certified entity 402 may obtain the digital certificate by retrieving the digital certificate from memory or from a remote device, or by requesting the digital certificate from a certificate authority, etc. In some cases (e.g., in the example shown in FIG. 9), the extension of the digital certificate includes both a second public key of the entity and a second digital signature of the certificate authority. In some cases (e.g., in the example shown in FIG. 5), the extension of the digital certificate includes a second public key of the entity but not a second digital signature of the certificate authority. In some cases (e.g., in the examples shown in FIG. 7), the extension of the digital certificate includes a second digital signature of the certificate authority but not a second public key of the entity. In some cases, the digital certificate includes a policy with instructions for verifying a second digital signature of the certificate authority (e.g. in the example shown in FIGS. 7 and 9) or in some instances, for verifying a digital signature and/or performing an encryption process (e.g. in the example shown in FIGS. 5 and 9). In some cases, a digital certificate with multiple public keys for the entity includes a policy to be used when performing processes associated with the digital certificate, such as digital signature verification and encryption/decryption (e.g. in the examples shown in FIGS. 5 and 9). In some cases, a digital certificate containing multiple public keys and certificate authority signatures (e.g. in the example shown in FIG. 9), may include a policy with instructions for processing additional data objects based on the procedure being performed, e.g. certification verification, digital signature verification, encryption.

After the certified entity 402 obtains the digital certificate, the certified entity 402 and the relying entity 404 can perform one or more sub-processes. As shown in FIG. 4, the certified entity 402 and the relying entity 404 can perform an authentication process 410 before performing a digital signature process 420 or an encryption process 430 (or both). The sub-processes may be performed in the order shown or in another order in some cases. The digital signature process 420 or the encryption process 430 (or both) may be omitted in some instances, or they may be performed in another order. In the example sub-processes shown in FIG. 4, the certified entity 402 and the relying entity 404 may send information directly to each other, or they may initiate transmission indirectly, for example, through a server. All or part of the information can be transmitted over a public channel, and may be observed by a quantum-enabled adversary or another type of adversary.

The example authentication process 410 is used to confirm that the digital certificate belongs to a valid entity. As shown in FIG. 4, at 412, the certified entity 402 sends the digital certificate to the relying entity 404, and at 414, the relying entity 404 receives the digital certificate from the certified entity 402. To authenticate the certified entity 402, the relying entity 404 verifies the digital certificate at 416. In some examples, the digital certificate includes an extension that contains a certificate authority digital signature associated with the second cryptosystem. In an implementation, the relying entity 404 is upgraded to support the second cryptosystem. In that case, the relying entity 404 may verify the digital certificate using an algorithm associated with the second cryptosystem (e.g., as described with respect to FIG. 8 or FIG. 10, as appropriate). In some examples, the relying entity 404 verifies the digital certificate using an algorithm associated with the first cryptosystem (e.g., as described with respect to FIG. 6). In some cases, a policy in the digital certificate provides instructions to an upgraded relying entity 404 for verifying the digital certificate using the second signature, the first signature, or, in some cases, the first and second signatures. For example, the policy may provide instructions to verify both the first signature and the second signature, and further instruct that the second signature is to be verified first. In this case, the digital certificate may be successfully validated based on first verifying the second signature and then verifying the first signature. On the other hand, the digital certificate may be successfully invalidated if either the first or second signature cannot be validated, or if the first and second signatures cannot be verified in the order instructed. The invalidation is considered successful in that an attack may have been prevented, e.g. an attack by quantum-enabled adversary 108 in FIG. 1. In some implementations, verifying the digital certificate at 416 includes verifying a certificate chain or performing multiple other types of checks. After the relying entity 404 has verified the digital certificate at 416, the relying entity is assured that the user identity in the digital certificate belongs to a valid entity in the PKI.

In some implementations, at 416, the relying entity 404 generates a certificate digest based at least in part on the extension of the digital certificate, and the relying entity 404 uses the certificate digest and a certificate authority public key to verify the digital certificate. In some cases, the digital certificate is verified using the certificate digest and the certificate authority public key for the first cryptosystem. In such cases, the certificate digest can be generated based on a version of the digital certificate that includes the second certificate authority signatures in the extension. In some cases, the digital certificate is verified by a relying entity 404, upgraded with the second cryptosystem, using the certificate digest and the certificate authority public key for the second cryptosystem. In such cases, the certificate digest can be generated based on a version of the digital certificate that does not include the first certificate authority signature (e.g., it can be removed before generating the certificate digest). In some cases, an upgraded relying entity 404 follows the policy (e.g. policy 725 or 925 assigned during certificate issuance) to verify the digital certificate using the first or second cryptosystems, or both. In some instances, the certificate digest may include a digital signature for a subsequent cryptosystem (e.g. a third cryptosystem, etc.). In some instances, a certificate digest may be generated for each signature to be used for verification of the certificate. In the cases in which more than one cryptosystem is supported by a certificate authority, the policy may provide instructions to an upgraded relying entity 404 indicating which certificate authority signature, or signatures, to trust and verify, and in some cases, indicate an order for performing verification. For example, in the case there is a third signature based on a third cryptosystem, the certificate digest can be generated based on a version of the digital certificate that includes the third certificate authority signature in the extension. The digital certificate is verified using the certificate digest and the certificate authority public key for the third cryptosystem. In such cases, the certificate digest can be generated based on a version of the digital certificate that does not include the first certificate authority signature. As the third certificate authority signature is generated independently of the second certificate authority signature, the certificate digest may also not include the second certificate authority signature. In some cases, the layering of the signatures in the digital certificate allows that any one of the digital signatures may be verified by generating the appropriate certificate digest for that particular digital signature.

The example digital signature process 420 or the example encryption process 430 can be used as an identification mechanism, to confirm that the certified entity 402 is in fact the owner of the verified user identity in the digital certificate. To provide such confirmation to the relying entity 404, the certified entity 402 proves to the relying entity 404 that it has possession of the private key corresponding to the public key in the digital certificate. Possession of the private key can be proven, for example, using a challenge-response protocol or another type of proof.

The digital signature process 420 can include the use of a digital signature algorithm for authenticated correspondence. In one example, the certified entity is 402 and the relying entity 404 are both end-entities, e.g. a secure email application. In some cases, the digital signature algorithm is associated with the first cryptosystem and therefore uses a key pair associated with the first cryptosystem. In some cases, the digital signature algorithm is associated with the second cryptosystem and therefore uses a key pair associated with the second cryptosystem. In some examples, the digital signature process 420 is performed by one or more applications such as, for example, a VPN application, a secure web browser application, a secure mail application or another type of application.

As shown in FIG. 4, at 422, the certified entity 402 generates a digital signature. The digital signature can be generated based on a message using a digital signature algorithm and a private key. In some examples, the digital certificate includes an extension that contains a public key associated with the second cryptosystem, and the certified entity 402 generates the digital signature using a private key associated with the second cryptosystem (e.g., as described with respect to FIG. 5 or FIG. 9, as appropriate). In some examples, the certified entity 402 generates the digital signature using a private key associated with the first cryptosystem (e.g., as described with respect to FIG. 7). In some cases, the digital signature can be generated based on a random value, a challenge value or another type of data object.

As shown in FIG. 4, at 424, the certified entity 402 sends the digital signature to the relying entity 404, and at 426, the relying entity 404 receives the digital signature from the certified entity 402. At 428, the relying entity 404 verifies the digital signature. The digital signature verification at 428 can be performed using data objects associated with either the first or second cryptosystem. In some examples, the digital certificate includes an extension that contains a public key associated with the second cryptosystem, and the relying entity 404 verifies the digital signature using the public key associated with the second cryptosystem (e.g., as described with respect to FIG. 5 or FIG. 9, as appropriate). In some examples, the relying entity 404 verifies the digital signature using the public key associated with the first cryptosystem (e.g., as described with respect to FIG. 7). In some cases, the relying entity 404, if it is upgraded, verifies the digital signature according to a policy in the digital certificate. In some instances, a policy in an extension of the digital certificate (e.g. policy 525 of FIG. 5 or policy 925 of FIG. 9) provides instructions to an upgraded relying entity 404 indicating which cryptosystem to use to verify the signature. In an example, an upgraded relying entity 404 reads the policy and, according to the policy instructions, verifies the digital signature using the first or second cryptosystem. The relying entity 404 uses the public key associated with the cryptosystem indicated in the policy for performing the digital signature verification. On the other hand, a relying entity 404 that is not upgraded ignores the extension, and thus, the policy, and verifies the signature according to the first cryptosystem.

The encryption process 430 can include the use of an encryption algorithm for confidential correspondence. In some cases, the encryption algorithm is associated with the first cryptosystem and therefore uses a key pair associated with the first cryptosystem. In other cases, the encryption algorithm is associated with the second cryptosystem and therefore uses a key pair associated with the second cryptosystem. In some cases, the encryption processes 430 can be used in a Transport Layer Security (TLS) protocol, for example, in a web browsing application, an e-mail application, a virtual private network (VPN) application, a voice-over-IP (VoIP) application or another type of Internet application. In some cases, the encryption processes 430 can be used in another type of application or system.

In the example shown in FIG. 4, at 432 the relying entity 404 encrypts a message. The encrypted message can be generated using an encryption algorithm and a public key. The relying entity 404 may, in some cases, encrypt the message with a symmetric key, and encrypt the symmetric key with the public key. In some examples, the relying entity 404 generates the encrypted message using a public key associated with the second cryptosystem. In some examples, the relying entity 404 performs the encryption using a public key associated with the first cryptosystem. In other cases, the relying entity 404 performs the encryption using a public key associated with the second cryptosystem. In some cases, a policy in the digital certificate provides instructions to an upgraded relying entity 404 that is encrypting the message how to encrypt it, e.g. using the first cryptosystem or the second cryptosystem. For example, the policy may indicate acceptable algorithm combinations and how to perform the encryption using them (e.g. layered encryption or encryption in parallel).

As shown in FIG. 4, at 434, the relying entity 404 sends the encrypted message to the certified entity 402, and at 436, the certified entity 402 receives the encrypted message from the relying entity 404. At 438, the certified entity 402 decrypts the message using a private key. The certified entity 402 may, in some cases, decrypt a symmetric key with the private key, and then decrypt the message with the symmetric key. If the relying entity 404 encrypted the message using the first public key of the certified entity 402, the certified entity 402 uses its private key associated with the first cryptosystem to decrypt the message. If the relying entity 404 encrypted the message using the second public key of the certified entity 402, the certified entity 402 uses its private key associated with the second cryptosystem to decrypt the message.

The digital signature process 420 and the encryption process 430 may use various cryptographic keys or shared secrets. In some cases, the certified entity's long term public key (associated with the first or second cryptosystem) from the digital certificate is used to verify the signature at 428 or to encrypt the message at 432, and the certified entity's corresponding long term private key is used to generate the signature at 422 or to decrypt the message at 438. In some cases, a short term key pair (including an ephemeral private key and ephemeral public key) can be derived and used in digital signature process 420 or the encryption process 430. In some cases, a symmetric key can be generated and used in the encryption process 430.

In some examples, the message that is signed in the digital signature process 420 or encrypted in the encryption process 430 is an e-mail message, an electronic document, or an electronic file that can be read, edited, rendered, manipulated or otherwise processed by a software application. In some examples, the message is a digest of another message, for example, a cryptographic hash of the other message or another type of digest. In some examples, the message is a data packet or a data object that can be read, edited, rendered, manipulated or otherwise processed by hardware. For example, the message may be processed by a signaling system implemented in hardware or firmware. The message can be, for example, a challenge value, a random value, an e-mail, an ephemeral key, a symmetric session key, a pre-master secret or another type of message.

FIG. 5 is a block diagram showing an example digital certificate 502 generated by a certificate authority based on a certificate signing request (CSR). The example digital certificate 502 shown in FIG. 5 includes a public key for a quantum-resistant cryptosystem, in addition to a public key for one or more other (e.g., quantum-vulnerable) cryptosystems. In some cases, the digital certificate includes a policy that includes processing rules for a new cryptosystem, e.g. the quantum-resistant cryptosystem, and one or more other previously used cryptosystems, e.g. the quantum-vulnerable cryptosystems.

The digital certificate 502 is generated based on a certificate request that includes a first public key 516 associated with a first cryptosystem (e.g., a quantum-vulnerable cryptosystem) and a second public key 520 associated with a second, different cryptosystem. In the example shown, the second cryptosystem is a quantum-resistant (QR) cryptosystem. The certificate request can include basic fields and extensions. The basic fields of the certificate request can include subject information (e.g., a user identity) in a subject field, issuer information (e.g., a certificate authority identity) in an issuer field, validity information in a validity field and the first public key 516 in a public key field. The extensions of the certificate request can include the second (QR) public key 520. In some cases, the entity submitting the certificate request includes a policy 515 in the request that includes instructions for performing digital signature verification and encryption/decryption process between end-entity peers using the first or second cryptosystems. The entity that generates the certificate request can sign the certificate request using the first cryptosystem and/or second cryptosystem. For example, a private key related to the first public key 516 may be used to generate a digital signature applied to the certificate request; and in some cases, a private key related to the second public key 520 may be used to generate a digital signature applied to the certificate request.

The digital certificate 502 shown in FIG. 5 is an example of a digital certificate that includes a first public key 516 associated with a first cryptosystem (e.g., a quantum-vulnerable cryptosystem) and a second public key 520 associated with a second, different cryptosystem. In the example shown, the second cryptosystem is a quantum-resistant (QR) cryptosystem.

As shown in FIG. 5, the digital certificate 502 includes basic fields 504 and extensions 506. The basic fields 504 include subject information 510 (e.g., a user identity) in a subject field, issuer information 512 (e.g., a certificate authority identity) in an issuer field, validity information 514 in a validity field, the first public key 516 in a public key field and a certificate authority signature 530 in a signature value field. The extensions 506 include the second (QR) public key 520 from the certificate request. In some cases, the digital certificate 502 may include extension fields for other public keys associated with other cryptosystems, e.g. digital certificate 502 may include a third public key, a fourth public key, etc. that may be stored in the extension (not shown). In some cases, the digital certificate may include a policy 525 that provides instructions for performing processes using cryptosystems associated with the two public keys (e.g. public key 516 and QR public key 520). The digital certificate 502 may include additional or different fields, extensions or other information.

The example digital certificate 502 shown in FIG. 5 is generated by a certificate authority in response to an example certificate request. As shown on the left in FIG. 5, the certificate authority generates the certificate authority signature 530 based on a version of the digital certificate 502 that includes the first public key 516 in the public key field and the second public key 520 in the extension. The certificate authority may, in some instances, include policy 515, provided by the requesting entity, in the digital certificate as policy 525. In the non-limiting example shown in FIG. 5, policy 525 is illustrated as part of the extensions 506 that include QR public key 520. In some implementations, policy 525 may be populated in an extension with the second public key 520, in another private extension, or in other non-critical field of the digital certificate 502. The certificate authority signature 530 is then populated into the signature value field of the digital certificate 502, as shown on the right in FIG. 5.

In some cases, the digital certificate 502 is generated in a certificate request and creation process performed by a requester and an issuer, which may proceed as follows in some instances. The requester generates a first key pair, which is associated with the first cryptosystem and includes the first public key 516 and a related first private key. The requester generates a second (QR) key pair, which is associated with the second (quantum-resistant) cryptosystem and includes the QR public key 520 and a related QR private key. In some cases, key pairs for other cryptosystems may be generated (e.g. a third or subsequent cryptosystem) by the requester. The requester inserts the QR public key 520 in an extension of a certificate signing request (CSR). The requester inserts the first public key 516 in the public key field in the basic fields of the CSR. The requester populates the other standard basic fields and extensions of the CSR. In some cases, the requester includes a policy 515 in the extensions 506 that includes instructions for verifying signatures using the first and second cryptosystems. Based on the populated CSR, the requester generates a digital signature using the requester's first private key. The requester sends the signed CSR to the issuer.

The issuer receives the signed CSR from the requestor and vets the requestor. The issuer verifies the requester's digital signature to ensure the requestor possesses the private key matching the first public key 516. The issuer verifies all other attributes of the CSR and may apply updates. The issuer populates one or more fields of the digital certificate 502, which includes the first public key 516 in the public key field and the QR public key 520 in the extensions 506. In some cases, the certificate request includes the policy 515, and the issuer includes the received policy in the issued certificate (e.g. policy 525). In other cases, the issuer may determine a policy, e.g. by a lookup in a database, and insert the policy 525 in the digital certificate. In some cases, policy 525 may include both the policy 515 received in the CSR and the policy with additional instructions determined by the issuer, e.g. by database lookup. The issuer then uses a certificate authority private key, which is associated with the first cryptosystem, to generate the certificate authority signature 530 based on the digital certificate 502. The issuer populates the certificate authority signature 530 into the signature value field in the basic fields 504. In some cases, the certificate request and creation process may include additional or different steps, or the process may proceed in another manner.

In some instances, the digital certificate 502, or information from the digital certificate 502, is used in a digital signature process such as, for example, the digital signature process 420 shown in FIG. 4. When the example digital certificate 502 shown in FIG. 5 is the basis of a digital signature process between a certificate owner and another entity, the identification process may proceed as follows in some instances. The certificate owner signs a message with the certificate owner's private key, which is related to one of the public keys in the digital certificate 502 (e.g. public key 516 and QR public key 520). The resulting digital signature is then sent to the other entity, and the other entity verifies the digital signature using the appropriate public key. In cases where the digital certificate 502 includes multiple public keys corresponding to multiple cryptosystems, (e.g. public key 516 and QR public key 520), the digital certificate may include a policy 525 with instructions for verifying the signature using the first or second cryptosystem. In some cases, the digital signature is generated by the certificate owner using the certificate owner's QR private key, which is associated with the second (quantum-resistant) cryptosystem and related to the QR public key 520; in such cases, the other entity verifies the digital signature using the QR public key 520. In some cases, the digital signature is generated using the certificate owner's first private key, which is associated with the first cryptosystem and related to the first public key 516; in such cases the other entity verifies the digital signature using the first public key 516. If the other entity is not upgraded, it verifies the digital signature using the first public key 516, ignoring the policy 525. If the other entity is upgraded, it may read the policy 525 to determine the instructions for verifying the digital signature using the first or second cryptosystem and its corresponding public key. In some cases, another type of digital signature process can be performed using the digital certificate 502, or information from the digital certificate 502.

In some instances, the digital certificate 502, or information from the digital certificate 502, is used in an encryption process such as, for example, the encryption process 430 shown in FIG. 4. When the example digital certificate 502 shown in FIG. 5 is the basis of an encryption process, the process may proceed as follows. The encrypting entity encrypts a message using one of the two public keys in the digital certificate 502. The encrypted message is then sent to the certificate owner, and the certificate owner decrypts the message using the appropriate private key (related to either the first public key 516 or the QR public key 520). In some cases, the message is encrypted using the QR public key 520 and decrypted using the certificate owner's related QR private key, which is associated with the second (quantum-resistant) cryptosystem. In some cases, the message is encrypted using the first public key 516 and decrypted using the certificate owner's related first private key, which is associated with the first cryptosystem. In some instances, the policy 525 may indicate which cryptosystem the encrypting entity should use for the encryption process, and encryption is performed with the corresponding public key. In some examples, the encrypting entity may encrypt the message with a symmetric key and then encrypt the symmetric key with one of the public keys; and the certificate owner may then decrypt the symmetric key with the private key and decrypt the message with the symmetric key. In some cases, another type of encryption process can be performed using the digital certificate 502, or information from the digital certificate 502.

Figure 6:
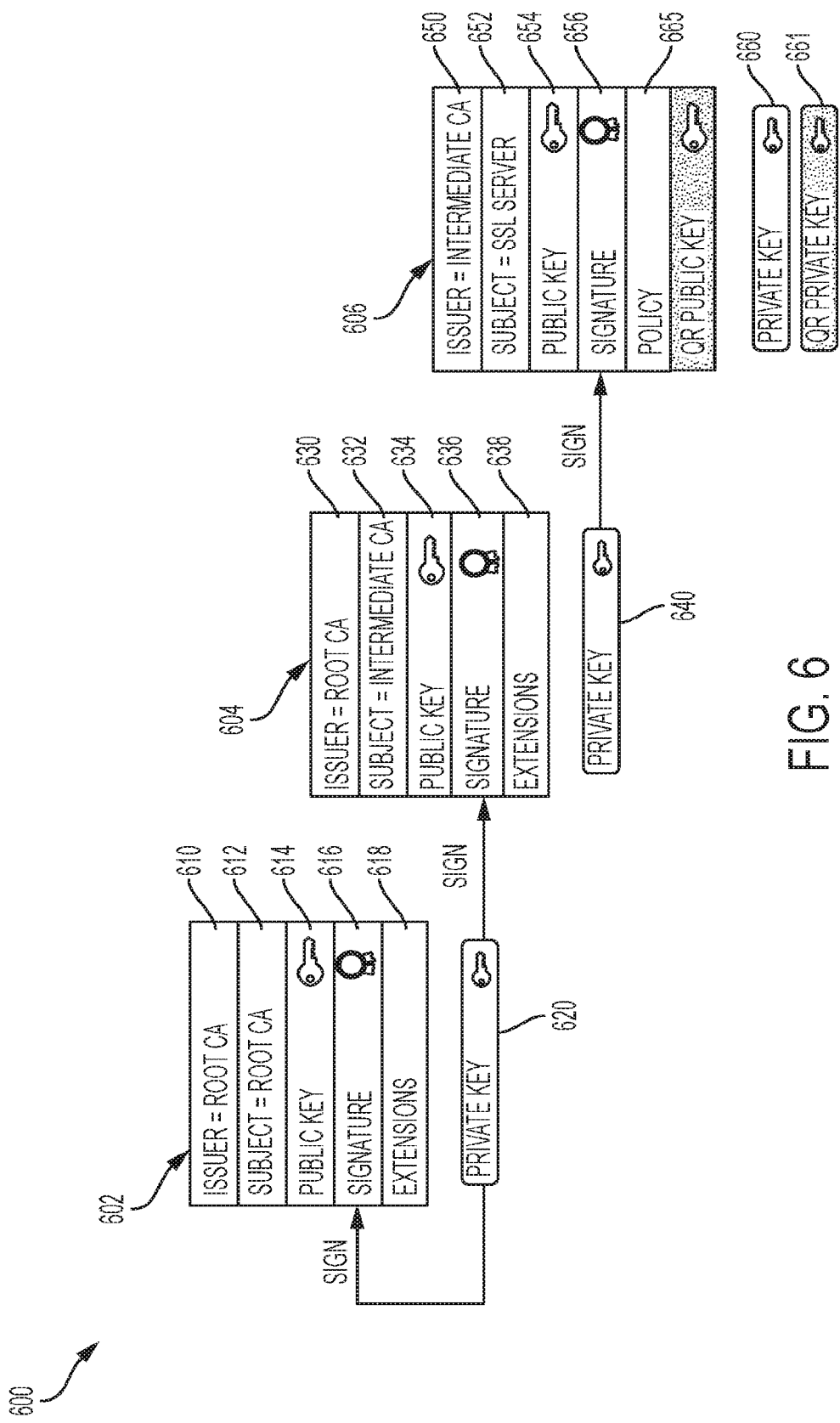
FIG. 6 is a block diagram showing an example certificate chain with a digital certificate that includes a public key for a quantum-resistant cryptosystem.

FIG. 6 is a block diagram showing an example certificate chain 600 with a digital certificate that includes a public key for a quantum-resistant cryptosystem, in addition to a public key for another (e.g., quantum-vulnerable) cryptosystem. The example certificate chain 600 shown in FIG. 6 includes three digital certificates—a root CA certificate 602, an intermediate CA certificate 604 and an end-entity certificate 606. The end-entity certificate 606 is an example of a digital certificate that can be created and formatted as the example digital certificate 502 shown in FIG. 5. In some cases, one or more of the digital certificates shown in FIG. 6 can be created and formatted in another manner. In the example shown in FIG. 6, the root CA certificate 602 is a self-signed certificate that can be verified using the root certificate authority's own public key; the intermediate CA certificate 604 and the end-entity certificate 606 are CA-signed certificate that can be verified using the appropriate certificate authority public key.

In the example shown in FIG. 6, the root CA certificate 602 belongs to a root certificate authority. The root certificate authority has a first key pair associated with a first cryptosystem. The first key pair includes a first certificate authority private key 620 and a first certificate authority public key 614. The example root CA certificate 602 includes issuer information 610 (the root CA's identity), subject information 612 (the root CA's identity), the first certificate authority public key 614, a first certificate authority signature 616 associated with the first cryptosystem and extensions 618. As shown in FIG. 6, the first certificate authority private key 620 is used to generate the first certificate authority signature 616. The root CA certificate 602 may include additional or different information.

In the example shown in FIG. 6, the intermediate CA certificate 604 belongs to an intermediate certificate authority. The intermediate certificate authority has a second key pair associated with the first cryptosystem. The second key pair includes a second certificate authority private key 640 and a second certificate authority public key 634. The example intermediate CA certificate 604 includes issuer information 630 (the root CA's identity), subject information 632 (the intermediate CA's identity), the second certificate authority public key 634, a second certificate authority signature 636 associated with the first cryptosystem and extensions 638. As shown in FIG. 6, the first certificate authority private key 620 is used to generate the second certificate authority signature 636. The intermediate CA certificate 604 may include additional or different information.

In the example shown in FIG. 6, the end-entity certificate 606 belongs to an SSL server entity. The SSL server entity has a third key pair associated with the first cryptosystem and a fourth key pair associated with a second (quantum-resistant) cryptosystem. The third key pair includes a first entity private key 660 and a first entity public key 654. The fourth key pair includes a second (QR) entity private key 661 and a second (QR) entity public key 658.

The example end-entity certificate 606 includes issuer information 650 (the intermediate CA's identity), subject information 652 (the SSL server entity's identity), the first entity public key 654, a third certificate authority signature 656 associated with the first cryptosystem, a policy 665, and the second (QR) entity public key 658. In an example, the policy 665 is associated with the certificate owner that supports multiple cryptosystems, as shown by it having two public keys (e.g. public key 654 and QR public key 658), but is not relevant for verifying the certificate authority signature. As shown in FIG. 6, the second certificate authority private key 640 is used to generate the third certificate authority signature 656. The end-entity certificate 606 may include additional or different information.

In the example shown in FIG. 6, the root CA certificate 602 is a self-signed certificate that can be verified using the root certificate authority's own public key; the intermediate CA certificate 604 and the end-entity certificate 606 are CA-signed certificate that can be verified using the appropriate certificate authority public key.

In some instances, the end-entity certificate 606, or information from the end-entity certificate 606, is used in an authentication process such as, for example, the example authentication process 410 shown in FIG. 4. When the example end-entity certificate 606 shown in FIG. 6 is the basis of an authentication process, the authentication process may proceed using the first cryptosystem as follows. The relying entity matches the issuer information 650 in the end-entity certificate 606 to the subject information 632 in the intermediate CA certificate 604. The relying entity then creates a certificate digest of some or all information in the end-entity certificate 606, excluding the third certificate authority signature 656. The relying entity then verifies the third certificate authority signature 656 against the digest using the second certificate authority public key 634 from the intermediate CA certificate 604. The relying entity may then verify the intermediate CA certificate 604 in a similar manner as follows. The relying entity matches the issuer information 630 in the intermediate CA certificate 604 to the subject information 612 in the root CA certificate 602. The relying entity then creates a certificate digest of some or all information in the intermediate CA certificate 604, excluding the second certificate authority signature 636. The relying entity then verifies the second certificate authority signature 636 against the digest using the first certificate authority public key 614 from the root CA certificate 602. In some cases, the root CA certificate 602 is explicitly trusted and does not need to be verified by the relying entity. In some cases, the root CA certificate 602 can be verified using the first certificate authority public key 614 from the root CA certificate 602. In some cases, another type of authentication process can be performed using the end-entity certificate 606, or information from the end-entity certificate 606.

FIG. 7 is a block diagram showing an example digital certificate 702 generated by a certificate authority based on a certificate signing request (CSR). The example digital certificate 702 shown in FIG. 7 includes a certificate authority signature for a quantum-resistant cryptosystem, in addition to a certificate authority signature for another (e.g., quantum-vulnerable) cryptosystem.

The digital certificate 702 is generated based on a certificate request that includes a public key 716 associated with a first cryptosystem (e.g., a quantum-vulnerable cryptosystem). The certificate request can include basic fields and extensions. The basic fields of the certificate request can include subject information (e.g., a user identity) in a subject field, issuer information (e.g., a certificate authority identity) in an issuer field, validity information in a validity field and the public key 716 in a public key field. The entity that generates the certificate request can sign the certificate request using the first cryptosystem. For example, a private key related to the public key 716 may be used to generate a digital signature applied to the certificate request.

The digital certificate 702 shown in FIG. 7 is an example of a digital certificate that includes a first certificate authority signature 740 associated with the first cryptosystem (e.g., a quantum-vulnerable cryptosystem) and a second certificate authority signature 730 associated with a second, different cryptosystem. In the example shown in FIG. 7, the public key 716 and the related private key are associated with a first cryptosystem, and the second cryptosystem is a quantum-resistant (QR) cryptosystem.

As shown in FIG. 7, the digital certificate 702 includes basic fields 704 and extensions 706. The basic fields 704 include subject information 710 (e.g., a user identity) in a subject field, issuer information 712 (e.g., a certificate authority identity) in an issuer field, validity information 714 in a validity field, the public key 716 in a public key field and the first certificate authority signature 740 in a signature value field. The extensions 706 include the second certificate authority signature 730. In some cases, the digital certificate 702 includes a policy that provides rules for verifying the certificate authority signatures, e.g. which signatures to verify and in what order. The digital certificate 702 may include additional or different fields, extensions or other information.

The example digital certificate 702 shown in FIG. 7 is generated by a certificate authority in response to an example certificate request. As shown on the left in FIG. 7, the second (QR) certificate authority signature 730 is generated before the first certificate authority signature 740. The certificate authority generates the second (QR) certificate authority signature 730 based on a version of the digital certificate 702 that includes the first public key 716 in the public key field, and the second (QR) certificate authority signature 730 is then populated into the extensions 706 of the digital certificate 702. The certificate authority then generates the first certificate authority signature 740 based on a version of the digital certificate 702 that includes the first public key 716 in the public key field and the second (QR) certificate authority signature 730 in the extensions 706, and the first certificate authority signature 740 is then populated into the signature value field of the digital certificate 702 as shown on the right in FIG. 7. In some cases, the certificate authority populates a policy 725 with instructions for verifying the one or more signatures associated with the multiple cryptosystems, e.g. certificate authority signature 730 and certificate authority signature 740 shown on the right in FIG. 7.

In some cases, the digital certificate 702 is generated in a certificate request and creation process performed by a requester and an issuer, which may proceed as follows, in some instances. The requester generates a key pair, which is associated with the first cryptosystem and includes the public key 716 and a related private key. The requester inserts the public key 716 in the public key field in the basic fields of a certificate signing request (CSR). The requester populates the other standard basic fields and extensions of the CSR. Based on the populated CSR, the requester generates a digital signature using the requester's private key. The requester sends the signed CSR to the issuer. The issuer receives the signed CSR from the requestor and vets the requestor. The issuer verifies the requestor's digital signature to ensure the requestor possesses the private key matching the public key 716. The issuer verifies all other attributes of the CSR and may apply updates. The issuer populates one or more fields of the digital certificate 702, which includes the public key 716 in the public key field. In the example shown in FIG. 7, the issuer supports multiple cryptosystems and will generate more than one signature (e.g. signature 740 and QR signature 730). In some cases, the issuer will determine a policy, e.g. by retrieval or look-up from a database, for verifying the multiple certificate authority signatures, and populate the policy 725. In the non-limiting example illustrated in FIG. 7, policy 725 is illustrated as part of the extensions 706. In some implementations, policy 725 may be populated in an extension with the QR signature 730, in another private extension, or in another non-critical field of the digital certificate 702. The issuer then uses a second certificate authority private key, which is associated with the second (quantum-resistant) cryptosystem, to generate a second (QR) certificate authority signature 730 based on the digital certificate 702. The issuer populates the second (QR) certificate authority signature 730 into the extensions 706. The issuer then uses a first certificate authority private key, which is associated with the first cryptosystem, to generate another signature (the first certificate authority signature 740) based on the digital certificate 702. The issuer populates the first certificate authority signature 740 into the signature value field in the basic fields 704. In some cases, the certificate request and creation process may include additional or different steps, or the process may proceed in another manner.

In some instances, the digital certificate 702, or information from the digital certificate 702, is used in a digital signature process such as, for example, the example digital signature process 420 shown in FIG. 4. When the example digital certificate 702 shown in FIG. 7 is the basis of a digital signature process between a certificate owner and another entity, the digital signature process may proceed as follows, in some instances. The certificate owner signs a message with the certificate owner's private key, which is related to the public key 716 in the digital certificate 702. The resulting digital signature is then sent to the other entity, and the other entity verifies the digital signature using the public key 716. In some cases, another type of digital signature process can be performed using the digital certificate 702, or information from the digital certificate 702. In this case, the certificate owner does not support a second cryptosystem, e.g. a QR cryptosystem, and there is no information in the extension for the certificate owner, e.g. a second public key In some instances, the digital certificate 702, or information from the digital certificate 702, is used in an encryption process such as, for example, in the encryption process 430 shown in FIG. 4. When the example digital certificate 702 shown in FIG. 7 is the basis of an encryption process, the process may proceed as follows, in some instances. The encrypting entity encrypts a message with the public key 716 from the digital certificate 702. The encrypted message is then sent to the certificate owner, and the certificate owner decrypts the message using the private key related the public key 716. In some cases, another type of secure electronic mail process can be performed using the digital certificate 702, or information from the digital certificate 702.

Figure 8:
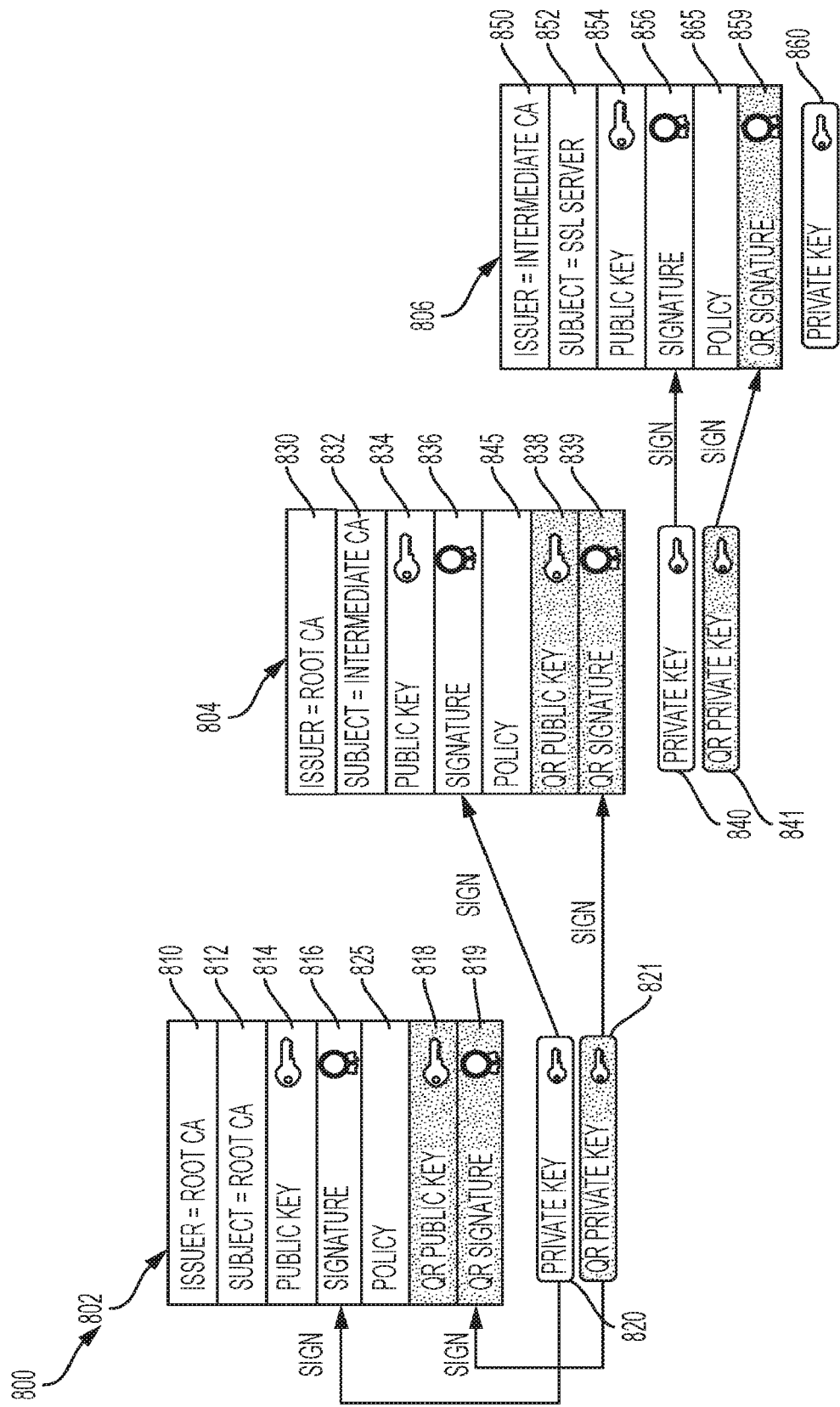
FIG. 8 is a block diagram showing an example certificate chain with a digital certificate that includes a certificate authority signature for a quantum-resistant cryptosystem.

FIG. 8 is a block diagram showing an example certificate chain 800 with a digital certificate that includes a certificate authority signature for a quantum-resistant cryptosystem, in addition to a certificate authority signature for another (e.g., quantum-vulnerable) cryptosystem. The example certificate chain 800 shown in FIG. 8 includes three digital certificates—a root CA certificate 802, an intermediate CA certificate 804 and an end-entity certificate 806. The intermediate CA certificate 804 is an example of a digital certificate that can be created and formatted as the example digital certificate 902 shown in FIG. 9. The end-entity certificate 806 is an example of a digital certificate that can be created and formatted as the example digital certificate 702 shown in FIG. 7. In some cases, one or more of the digital certificates shown in FIG. 8 can be created and formatted in another manner. In the example shown in FIG. 8, the root CA certificate 802 is a self-signed certificate that can be verified using the root certificate authority's own public key; the intermediate CA certificate 804 and the end-entity certificate 806 are CA-signed certificates that can be verified using the appropriate certificate authority public key.

In the example shown in FIG. 8, the root CA certificate 802 belongs to a root certificate authority. The root certificate authority has a first key pair associated with a first cryptosystem and a second key pair associated with a second (quantum-resistant) cryptosystem. The first key pair includes a first certificate authority private key 820 and a first certificate authority public key 814. The second key pair includes a second (QR) certificate authority private key 821 and a second (QR) certificate authority public key 818.

The example root CA certificate 802 includes issuer information 810 (the root CA's identity), subject information 812 (the root CA's identity), the first certificate authority public key 814, a first certificate authority signature 816 associated with the first cryptosystem, the second (QR) certificate authority public key 818 and a second (QR) certificate authority signature 819 associated with the second cryptosystem. In some cases, the root CA certificate 802 includes a policy 825 that includes instructions for performing processes associated with the multiple cryptosystems (e.g. the first and second cryptosystem). As shown in FIG. 8, the first certificate authority private key 820 is used to generate the first certificate authority signature 816, and the second (QR) certificate authority private key 821 is used to generate the second (QR) certificate authority signature 819. The root CA certificate 802 may include additional or different information.

In the example shown in FIG. 8, the intermediate CA certificate 804 belongs to an intermediate certificate authority. The intermediate certificate authority has a third key pair associated with the first cryptosystem and a fourth key pair associated with the second (quantum-resistant) cryptosystem. The third key pair includes a third certificate authority private key 840 and a third certificate authority public key 834. The fourth key pair includes a fourth (QR) certificate authority private key 841 and a fourth (QR) certificate authority public key 838.

The example intermediate CA certificate 804 includes issuer information 830 (the root CA's identity), subject information 832 (the intermediate CA's identity), the third certificate authority public key 834, a third certificate authority signature 836 associated with the first cryptosystem, the fourth (QR) certificate authority public key 838 and a fourth (QR) certificate authority signature 839 associated with the second cryptosystem. In some cases, the intermediate CA certificate 804 includes a policy 845 with instructions for performing processes associated with data objects of the multiple cryptosystems (e.g. the first and second cryptosystem). As shown in FIG. 8, the first certificate authority private key 820 is used to generate the third certificate authority signature 836, and the second (QR) certificate authority private key 821 is used to generate the fourth (QR) certificate authority signature 839. The intermediate CA certificate 804 may include additional or different information.

In the example shown in FIG. 8, the end-entity certificate 806 belongs to an SSL server entity. The SSL server entity has a fifth key pair associated with the first cryptosystem. The fifth key pair includes a first entity private key 860 and a first entity public key 854.

The example end-entity certificate 806 includes issuer information 850 (the intermediate CA's identity), subject information 852 (the SSL server entity's identity), the first entity public key 854, a fifth certificate authority signature 856 associated with the first cryptosystem and a sixth (QR) certificate authority signature 859 associated with the second cryptosystem. As shown in FIG. 8, the third certificate authority private key 840 is used to generate the fifth certificate authority signature 856, and the fourth (QR) certificate authority private key 841 is used to generate the sixth (QR) certificate authority signature 859. In some cases, the end-entity certificate 806 includes a policy 865 containing instructions for verifying the issuer signatures associated with multiple cryptosystems (e.g. first and second cryptosystem). The end-entity certificate 806 may include additional or different information.

In the example shown in FIG. 8, the root CA certificate 802 is a self-signed certificate that can be verified using the root certificate authority's own public key; the intermediate CA certificate 804 and the end-entity certificate 806 are CA-signed certificates that can be verified using the appropriate certificate authority public key.

In some instances, the end-entity certificate 806, or information from the end-entity certificate 806, is used in an authentication process such as, for example, the example authentication process 410 shown in FIG. 4. When the example end-entity certificate 806 shown in FIG. 8 is the basis of an authentication process, the authentication process may proceed using the data objects (814, 816, 834, 836, 854, 856) associated with the first cryptosystem in a manner that is analogous to the authentication process described with respect to the example certificate chain 600 shown in FIG. 6. Additionally or alternatively, when the example end-entity certificate 806 shown in FIG. 8 is the basis of an authentication process, the authentication process may proceed using the second (quantum-resistant) cryptosystem, and in some cases, in addition to the first cryptosystem, as follows. The relying entity matches the issuer information 850 in the end-entity certificate 806 to the subject information 832 in the intermediate CA certificate 804. The relying entity creates a certificate digest of some or all information in the end-entity certificate 806, excluding the fifth certificate authority signature 856 and the sixth (QR) certificate authority signature 859. The relying entity then verifies the sixth (QR) certificate authority signature 859 against the digest using the fourth (QR) certificate authority public key 838 from the intermediate CA certificate 804. In instances where the policy 865 is included in the digital certificate 806, the relying entity, if upgraded, checks the policy 865 for instructions for verifying the multiple signatures generated by the intermediate CA (e.g. fifth certificate authority signature 856 and QR sixth certificate authority signature 859). The policy 865 may direct the relying entity to verify one or both of the signatures, and in some cases, may specify that verification should be performed in a certain order.

The relying entity may then verify the intermediate CA certificate 804 in a similar manner as follows. The relying entity matches the issuer information 830 in the intermediate CA certificate 804 to the subject information 812 in the root CA certificate 802. The relying entity, if upgraded, checks the policy 845 for instructions to verify the multiple signatures generated by the root CA (e.g. third certificate authority signature 836 and fourth QR certificate authority signature 839). In some cases, the instructions direct the relying entity to verify the fourth QR certificate authority signature 839. In that case, the relying entity creates a certificate digest of some or all information in the intermediate CA certificate 804, excluding the third certificate authority signature 836 and the fourth (QR) certificate authority signature 839. The relying entity then verifies the fourth (QR) certificate authority signature 839 against the digest using the second (QR) certificate authority public key 818 from the root CA certificate 802. In some cases, the policy 845 may, additionally or alternatively, instruct the relying entity, if upgraded, to verify the third certificate authority signature 836. In that case, the third certificate authority signature 836 is excluded from the certificate digest, but the fourth (QR) certificate authority signature 839 is not. The relying entity then verifies the third certificate authority signature 836 against the digest using the third (QR) certificate authority public key 816 from the intermediate CA certificate 804.

In some cases, the root CA certificate 802 is explicitly trusted and does not need to be verified by the end-entity. In some cases, the root CA certificate 802 can be verified using the second (QR) certificate authority public key 818 from the root CA certificate 802, using the first certificate authority public key 814 from the root CA 802, or using both. In cases in which a policy 825 is provided in the root CA certificate 802, the relying entity, if upgraded, may read the policy 825 for instructions to verify digital certificate 802 of the root CA having multiple signatures (e.g. signature 816 and QR signature 819). In some cases, another type of authentication process can be performed using the end-entity certificate 806, or information from the end-entity certificate 806.

FIG. 9 is a block diagram showing an example digital certificate 902 generated by a certificate authority based on a certificate signing request (CSR). The example digital certificate 902 shown in FIG. 9 includes a certificate authority signature and a public key for a quantum-resistant cryptosystem, in addition to a certificate authority signature and a public key for another (e.g., quantum-vulnerable) cryptosystem.

The digital certificate 902 is generated based on a certificate request that includes a first public key 916 associated with a first cryptosystem (e.g., a quantum-vulnerable cryptosystem), a second public key 920 associated with a second, different cryptosystem, a first digital signature associated with the first cryptosystem and a second digital signature associated with the second cryptosystem. In the example shown, the second cryptosystem is a quantum-resistant (QR) cryptosystem. The certificate request can include basic fields and extensions. The basic fields of the certificate request can include subject information (e.g., a user identity) in a subject field, issuer information (e.g., a certificate authority identity) in an issuer field, validity information in a validity field and the first public key 916 in a public key field. The extensions of the certificate request can include the second (QR) public key 920. In some cases, the requester includes a policy 915 that includes instructions for performing processes associated with the digital certificate 902 using the first and second cryptosystems. The entity that generates the certificate request can sign the certificate request using the first cryptosystem or the second cryptosystem (or both). For example, a private key related to the first public key 916 may be used to generate a digital signature applied to the certificate request, or a private key related to the QR public key 920 may be used to generate a (QR) digital signature applied to the certificate request.

The digital certificate 902 shown in FIG. 9 is an example of a digital certificate that includes a first public key 916 associated with a first cryptosystem (e.g., a quantum-vulnerable cryptosystem) and a second public key 920 associated with a second, different cryptosystem. The digital certificate 902 shown in FIG. 9 is also an example of a digital certificate that includes a first certificate authority signature 940 associated with a first cryptosystem (e.g., a quantum-vulnerable cryptosystem) and a second certificate authority signature 930 associated with a second, different cryptosystem. In some cases, the digital certificate 902 includes a policy 925 with instructions for performing processes associated with data objects of the first and the second (QR) cryptosystem. In the example shown, the second cryptosystem is a quantum-resistant (QR) cryptosystem.

As shown in FIG. 9, the digital certificate 902 includes basic fields 904 and extensions 906. The basic fields 904 include subject information 910 (e.g., a user identity) in a subject field, issuer information 912 (e.g., a certificate authority identity) in an issuer field, validity information 914 in a validity field, the first public key 916 in a public key field and the first certificate authority signature 940 in a signature value field. The extensions 906 include the second (QR) public key 920 and the second (QR) certificate authority signature 930. In a non-limiting example, policy 925 is illustrated as part of the extensions 906. In some implementations, policy 925 may be populated in an extension with the second (QR) public key 920 and/or the second (QR) certificate authority signature 930, in another private extension, or in other non-critical field of the digital certificate 902. The digital certificate 902 may include additional or different fields, extensions or other information.

The example digital certificate 902 shown in FIG. 9 is generated by a certificate authority in response to an example certificate request. In some cases, the certificate authority supports multiple cryptosystems and will generate more than one signature (e.g. signature 940 and QR signature 930). In some instances, the certificate authority will determine a policy to be populated in the digital certificate (e.g. policy 925). As shown on the left in FIG. 9, the second (QR) certificate authority signature 930 is generated before the first certificate authority signature 940. The certificate authority generates the second (QR) certificate authority signature 930 based on a version of the digital certificate 902 that includes the first public key 916 in the public key field and the second (QR) public key 920 in the extension 906; the second (QR) certificate authority signature 930 is then populated into the extensions 906. The certificate authority then generates the first certificate authority signature 940 based on a version of the digital certificate 902 that includes the first public key 916 in the public key field, the second (QR) public key 920 in the extension 906, and the second (QR) certificate authority signature 930 in the extensions 906; the first certificate authority signature 940 is then populated into the signature value field of the digital certificate 902 as shown on the right in FIG. 9. In some instances, the certificate authority may support additional cryptosystems (e.g. a third, fourth, etc.) in the extension. In that case, for example, the certificate authority generates the third certificate authority signature based on a version of the digital certificate 902 that includes the first public key 916 in the public key field, and the second (QR) public key 920 and a third public key (not shown) in the extension 906; the third certificate authority signature (not shown) is then populated into the extensions 906. A similar process may be used to generate signatures for additional cryptosystems (e.g. fourth, fifth, etc.).

In some cases, the digital certificate 902 is generated in a certificate request and creation process performed by a requester and an issuer, which may proceed as follows, in some instances. The requester generates a first key pair, which is associated with the first cryptosystem and includes the first public key 916 and a related first private key. The requester generates a second (QR) key pair, which is associated with the second (quantum-resistant) cryptosystem and includes the QR public key 920 and a related QR private key. The requester inserts the QR public key 920 in an extension of a certificate signing request (CSR). In some cases, the requester supports additional cryptosystems and generates additional key pairs for each one (e.g. third, fourth, etc.) and inserts the public keys corresponding to those additional cryptosystems in the extension of the CSR (not shown). In some cases, the requester provides a policy 915 for processing data objects associated with the multiple cryptosystems in the CSR. The requester inserts the first public key 916 in the public key field in the basic fields of the CSR. The requester populates the other standard basic fields and extensions. Based on the populated CSR, the requester generates digital signatures using each of the requester's private keys. The requester sends the signed CSR to the issuer. The issuer receives the signed CSR from the requestor and vets the requestor. The issuer verifies the signatures to ensure the requestor possesses the private keys matching the first public key 916 and the QR public key 920 (and any additional signatures using corresponding additional keys, not shown). The issuer verifies all other attributes of the CSR and may apply updates. The issuer populates one or more fields of the digital certificate 902, which includes the first public key 916 in the public key field and the policy 925 and the QR public key 920 (and any additional public keys, not shown) in the extensions 906. In cases in which the certificate request includes a policy 915, the issuer includes the received policy 915 in the issued certificate (e.g. policy 925). In some cases, the issuer may determine a policy with instructions for verifying certificate authority issuer signatures (e.g. signature 940 and QR signature 930). In some instances, the issuer determines the policy, e.g. by a lookup in a database, and inserts the policy 925 in the digital certificate 902. In some cases, policy 925 may include the policy 915 received in the CSR in addition to the policy with additional instructions determined by the issuer. The issuer then uses a second certificate authority private key, which is associated with the second (quantum-resistant) cryptosystem, to generate the second (QR) certificate authority signature 930 based on the digital certificate 902. The issuer populates the second (QR) certificate authority signature 930 into the extensions 906. The issuer then uses a first certificate authority private key, which is associated with the first cryptosystem, to generate another certificate authority signature (the first certificate authority signature 940) based on the digital certificate 902. The issuer populates the first certificate authority signature 940 into the signature value field in the basic fields 904. In some cases, the certificate request and creation process may include additional or different steps, or the process may proceed in another manner.

In some instances, the digital certificate 902, or information from the digital certificate 902, is used in a digital signature process such as, for example, the example digital signature process 420 shown in FIG. 4. When the example digital certificate 902 shown in FIG. 9 is the basis of a digital signature process between a certificate owner and another entity, the digital signature process can proceed in a manner that is analogous to the digital signature process described with respect the example digital certificate 502 shown in FIG. 5, or the digital signature process may proceed in another manner.

In some instances, the digital certificate 902, or information from the digital certificate 902, is used in an encryption process such as, for example, in the encryption process 430 shown in FIG. 4. When the example digital certificate 902 shown in FIG. 9 is the basis of an encryption process, the process may proceed in a manner that is analogous to the encryption process described with respect the example digital certificate 502 shown in FIG. 5, or the process may proceed in another manner.

Figure 10:
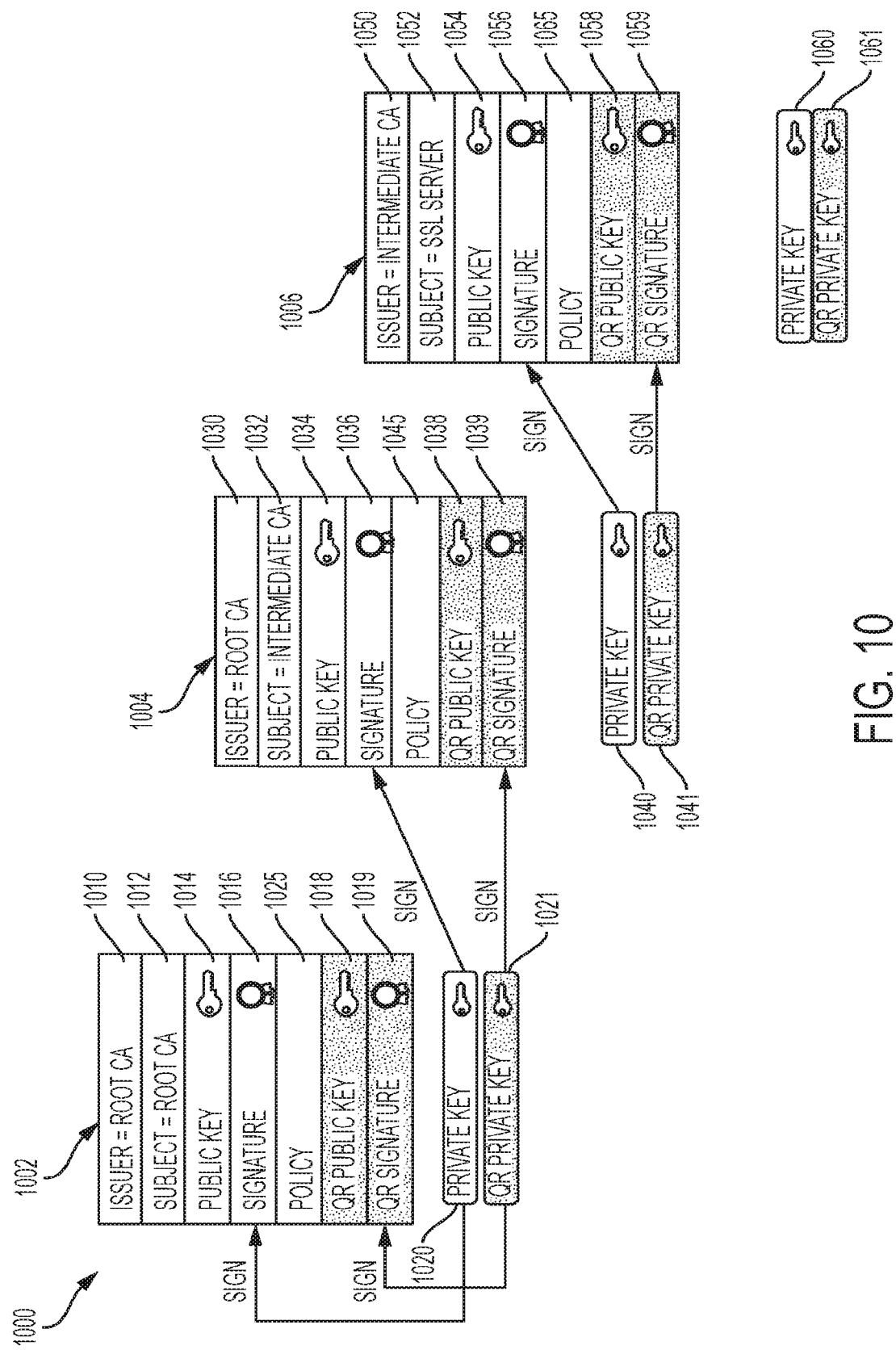
FIG. 10 is a block diagram showing an example certificate chain with a digital certificate that includes a certificate authority signature and public key for a quantum-resistant cryptosystem.

FIG. 10 is a block diagram showing an example certificate chain 1000 with a digital certificate that includes a certificate authority signature and public key for a quantum-resistant cryptosystem, in addition to a certificate authority signature and a public key for another (e.g., quantum-vulnerable) cryptosystem. The example certificate chain 1000 shown in FIG. 10 includes three digital certificates—a root CA certificate 1002, an intermediate CA certificate 1004 and an end-entity certificate 1006. The intermediate CA certificate 1004 and the end-entity certificate 1006 are examples of digital certificates that can be created and formatted as the example digital certificate 902 shown in FIG. 9. In some cases, one or more of the digital certificates shown in FIG. 10 can be created and formatted in another manner. In the example shown in FIG. 10, the root CA certificate 1002 is a self-signed certificate that can be verified using the root certificate authority's own public key; the intermediate CA certificate 1004 and the end-entity certificate 1006 are CA-signed certificate that can be verified using the appropriate certificate authority public key.

In the example shown in FIG. 10, the root CA certificate 1002 belongs to a root certificate authority. The root certificate authority has a first key pair associated with a first cryptosystem and a second key pair associated with a second (quantum-resistant) cryptosystem. The first key pair includes a first certificate authority private key 1020 and a first certificate authority public key 1014. The second key pair includes a second (QR) certificate authority private key 1021 and a second (QR) certificate authority public key 1018.

The example root CA certificate 1002 includes issuer information 1010 (the root CA's identity), subject information 1012 (the root CA's identity), the first certificate authority public key 1014, a first certificate authority signature 1016 associated with the first cryptosystem, a policy 1025 with instructions for processing data objects associated with multiple cryptosystems (e.g. the first and second cryptosystems) supported by the root CA (as described in FIG. 9), the second (QR) certificate authority public key 1018 and a second (QR) certificate authority signature 1019 associated with the second cryptosystem. As shown in FIG. 10, the first certificate authority private key 1020 is used to generate the first certificate authority signature 1016, and the second (QR) certificate authority private key 1021 is used to generate the second (QR) certificate authority signature 1019. The root CA certificate 1002 may include additional or different information.

In the example shown in FIG. 10, the intermediate CA certificate 1004 belongs to an intermediate certificate authority. The intermediate certificate authority has a third key pair associated with the first cryptosystem and a fourth key pair associated with the second (quantum-resistant) cryptosystem. The third key pair includes a third certificate authority private key 1040 and a third certificate authority public key 1034. The fourth key pair includes a fourth (QR) certificate authority private key 1041 and a fourth (QR) certificate authority public key 1038.

The example intermediate CA certificate 1004 includes issuer information 1030 (the root CA's identity), subject information 1032 (the intermediate CA's identity), the third certificate authority public key 1034, a third certificate authority signature 1036 associated with the first cryptosystem—the fourth (QR) certificate authority public key 1038 and a fourth (QR) certificate authority signature 1039 associated with the second cryptosystem. In some cases, a policy is provided by the issuer and included in the intermediate CA certificate as policy 1045. As shown in FIG. 10, the first certificate authority private key 1020 is used to generate the third certificate authority signature 1036, and the second (QR) certificate authority private key 1021 is used to generate the fourth (QR) certificate authority signature 1039. The intermediate CA certificate 1004 may include additional or different information.

In the example shown in FIG. 10, the end-entity certificate 1006 belongs to an SSL server entity. The SSL server entity has a fifth key pair associated with the first cryptosystem and a sixth key pair associated with the second (quantum-resistant) cryptosystem. The fifth key pair includes a first entity private key 1060 and a first entity public key 1054. The sixth key pair includes a second (QR) entity private key 1061 and a second (QR) entity public key 1058. In some cases, the SSL server entity provides a policy associated with instructions for performing processes using the first and second cryptosystems, which is included in policy 1065.

The example end-entity certificate 1006 includes issuer information 1050 (the intermediate CA's identity), subject information 1052 (the SSL server entity's identity), the first entity public key 1054, a fifth certificate authority signature 1056 associated with the first cryptosystem, the second (QR) entity public key 1058 and a sixth (QR) certificate authority signature 1059 associated with the second cryptosystem. In some cases, the issuer provides a policy 1065 with instructions for verifying certificate authority signatures associated with the first and second cryptosystems (e.g. fifth certificate authority signature 1056 and sixth QR certificate authority signature 1059) in the digital certificate 1006. As shown in FIG. 10, the third certificate authority private key 1040 is used to generate the fifth certificate authority signature 1056, and the fourth (QR) certificate authority private key 1041 is used to generate the sixth (QR) certificate authority signature 1059. The end-entity certificate 1006 may include additional or different information.

In the example shown in FIG. 10, the root CA certificate 1002 is a self-signed certificate that can be verified using the root certificate authority's own public key; the intermediate CA certificate 1004 and the end-entity certificate 1006 are CA-signed certificates that can be verified using the appropriate certificate authority public key. In some instances, one or more of the certificates may be verified according to a policy (e.g. 1025, 1045, 1065) associated with the respective certificate.

In some instances, the end-entity certificate 1006, or information from the end-entity certificate 1006, is used in an authentication process such as, for example, the example authentication process 410 shown in FIG. 4. When the example end-entity certificate 1006 shown in FIG. 10 is the basis of an authentication process, the authentication process may proceed using the data objects (1014, 1016, 1034, 1036, 1054, 1056) associated with the first cryptosystem in a manner that is analogous to the authentication process described with respect to the example certificate chain 600 shown in FIG. 6. Additionally or alternatively, when the example end-entity certificate 1006 shown in FIG. 10 is the basis of an authentication process, the authentication process may proceed using the second (quantum-resistant) cryptosystem, in addition to the first cryptosystem, as follows. The relying entity matches the issuer information 1050 in the end-entity certificate 1006 to the subject information 1032 in the intermediate CA certificate 1004. The relying entity then creates a certificate digest of some or all information in the end-entity certificate 1006, excluding the fifth certificate authority signature 1056 and the sixth (QR) certificate authority signature 1059. The relying entity then verifies the sixth (QR) certificate authority signature 1059 against the digest using the fourth (QR) certificate authority public key 1038 from the intermediate CA certificate 1004. In instances where the policy 1065 is provided in the digital certificate 1006, the relying entity, if upgraded, checks the policy 1065 for instructions for verifying the multiple signatures generated by the intermediate CA (e.g. fifth certificate authority signature 1056 and sixth QR certificate authority signature 1059). The policy instructions may direct the relying entity to verify one or both of the signatures, and in some cases, may specify that verification should be performed in a certain order The relying entity may then verify the intermediate CA certificate 1004 in a similar manner as follows. The end-entity matches the issuer information 1030 in the intermediate CA certificate 1004 to the subject information 1012 in the root CA certificate 1002. The relying entity, if upgraded, then creates a certificate digest of some or all information in the intermediate CA certificate 1004, excluding the third certificate authority signature 1036 and the fourth (QR) certificate authority signature 1039. The relying entity then verifies the fourth (QR) certificate authority signature 1039 against the digest using the second (QR) certificate authority public key 1018 from the root CA certificate 1002. In some cases, the policy 1045 may, additionally or alternatively, instruct the relying entity, if upgraded, to verify the third certificate authority signature 1036. In that case, the third certificate authority signature 1036 is excluded from the certificate digest, but the fourth (QR) certificate authority signature 1039 is not.

In some cases, the root CA certificate 1002 is explicitly trusted and does not need to be verified by the relying entity. In some cases, the root CA certificate 1002 can be verified using the second (QR) certificate authority public key 1018 from the root CA certificate 1002. In cases in which a policy 1025 is provided in the root CA certificate 1002, policy 1025 may be read by the relying entity, if upgraded, for instructions to verify the digital certificate 1002 of the root CA having multiple signatures (e.g. signature 1016 and QR signature 1019). In some cases, another type of authentication process can be performed using the end-entity certificate 1006, or information from the end-entity certificate 1006.

Figure 11:
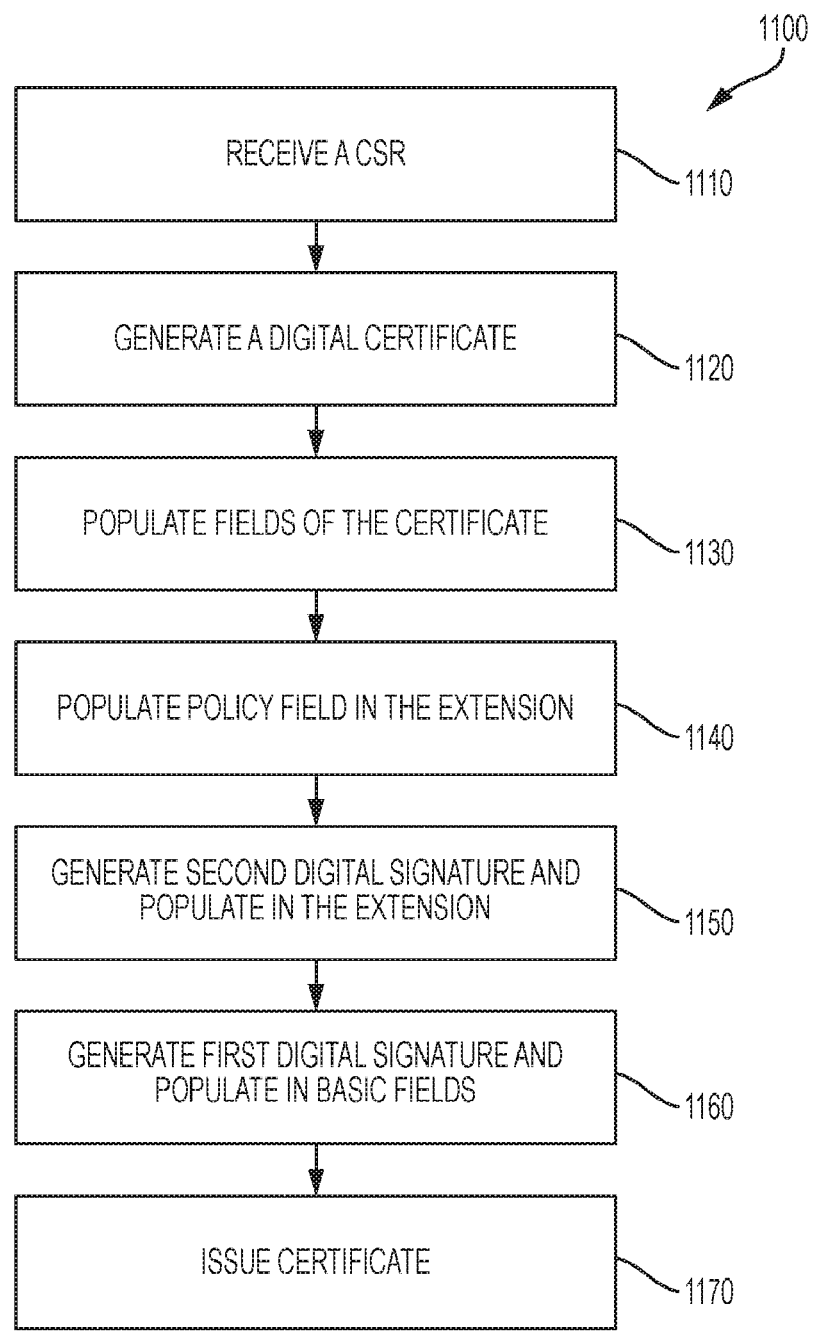
FIG. 11 is a flow diagram showing an example process for using a policy for processing a digital certificate that includes information for multiple cryptosystems.

FIG. 11 is a flow diagram showing an example process 1100 for issuing a digital certificate. In some cases, the digital certificate includes a policy for processing a digital certificate containing information for multiple cryptosystems. The example process 1100 can be performed, for example, by computer systems that can exchange information over a network. For instance, operations in the process 1100 may be performed by any of the nodes (e.g., the entity nodes 102, 104) in the example communication system 100 shown in FIG. 1 or in another type of system. In particular, the example process may be performed in conjunction with, or in some cases, in addition to, any of the operations described in FIGS. 4-10.

At 1110, a certificate request is received. The certificate request is received from an entity requesting a digital certificate by a certificate authority. In some cases, the entity may be entity 302 and the certificate authority may be certificate authority 304, as described in FIG. 3. The certificate request may include a first public key of the entity associated with a first cryptosystem.

At 1120, a digital certificate is generated comprising unpopulated fields. The digital certificate may then be populated with several fields, e.g. like digital certificates illustrated in FIG. 7 or 9. At 1130, a public key field of the digital certificate is populated with the first public key of the entity e.g. public key 716 or 916. At 1140, a policy field in an extension of the digital certificate is populated with a policy for processing a second digital signature associated with a second cryptosystem, e.g. policy 725 in extension 706, and policy 925 in extension 906. At 1150, the second digital signature of the certificate authority is generated using a second private key associated with the second cryptosystem, and is populated in a second signature value field in the extension of the digital certificate, e.g. QR signature 730 and 930. The second digital signature may be generated from the digital certificate comprising the first public key and the policy. At 1160, a first digital signature of the certificate authority is generated using a first private key associated with the first cryptosystem, and is populated in a first signature value field in the digital certificate, e.g. signature 740 and 940. At 1170, the digital certificate is transmitted from the certificate authority node to a node associated with the entity in response to the certificate request, e.g. as illustrated in FIG. 3.

In some cases, a cryptographic signing technique is associated with each cryptosystem used in producing the digital certificate. A policy database may be examined to locate an identity of each cryptographic signing technique required to process the digital certificate, and a policy is generated corresponding to the cryptographic signing techniques required.

In some cases, the certificate request comprises a second public key of the entity associated with the second cryptosystem. In that instance, a second public key field in the extension of the digital certificate is populated with the second public key of the entity. The policy includes a policy, received in the certificate request or provided by the certificate authority, for processing a digital signature generated with the second public key of the entity. The first digital signature is then generated from the digital certificate comprising the first public key, the second public key, the policy, and the second digital signature.

In some cases, the digital signature includes a plurality of signatures, which includes the first and second digital signatures. In an example, the policy comprises instructions indicating an identity of one or more of the plurality of signatures in the digital signature to be verified. In some cases, the policy may also include instructions indicating a priority order for verifying the one or more of the plurality of signatures to be verified. In one example, the policy may require verification of the first digital signature, the second digital signature, or both the first and second digital signatures. In another example, the policy may require verifying the first and second digital signatures in a particular order, e.g. verifying the first digital signature first and if it is verified, proceed to verify the second digital signature. However, if the priority digital signature, e.g. the first digital signature, cannot be verified, then the verification of the digital certificate fails regardless of whether the second digital certificate can be verified. In some instances, the plurality of signatures comprises a third digital signature in the extension of the digital certificate. In that case, the policy may require verification of the first digital signature, the second digital signature, the third digital signature, or any combination thereof. In some cases, the policy may indicate a priority in which the digital signatures are to be verified. For example, the policy may identify the first digital certificate as the priority digital signature for verification, and may further indicate that either one of the second and third digital signatures is to be verified, but not both. In other cases, the policy may identify the first digital certificate as the priority digital signature for verification, and my further indicate that both the second and third digital signatures are to be verified.

In some cases, the first cryptosystem is a legacy system and the second cryptosystem is a cryptosystem different from the first cryptosystem. In other cases, the first cryptosystem comprises a quantum-vulnerable cryptosystem, and the second cryptosystem comprises a quantum-resistant cryptosystem. In some cases, a third digital signature is generated using a third private key of the certificate authority associated with a third cryptosystem different from the first and second cryptosystems. Another signature value field in the extension of the digital certificate is populated with the third digital signature, and, in some cases, the policy in the extension includes instructions for processing the third digital signature.

At 1140, the digital certificate is transmitted from the certificate authority node to a node associated with the entity. In some cases, the entity is now able to communicate with another entity or node using the digital certificate issued by the certificate authority.

Figure 12:
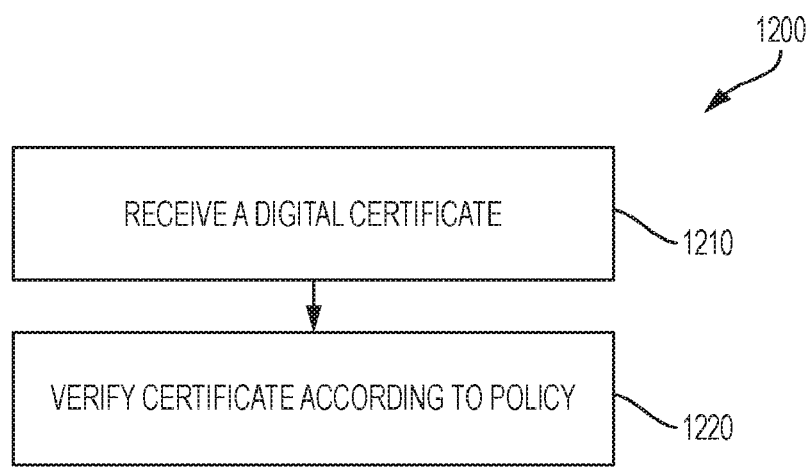
FIG. 12 is a flow diagram showing an example process for verifying a digital certificate that includes information for multiple cryptosystems.

FIG. 12 is a flow diagram showing an example process for verifying a digital certificate that includes information for multiple cryptosystems.

At 1210, a digital certificate is received by an entity. The digital certificate includes a public key field comprising a first public key of an entity, the first public key of the entity associated with a first cryptosystem, a signature value field including a first digital signature of a certificate authority, the first digital signature associated with the first cryptosystem. In some cases, the digital certificate includes an extension. The extension includes various fields. For example, the extension includes a second signature value field that includes a second digital signature generated using a second private key of the certificate authority, in which the second private key is associated with the second cryptosystem. The extension may also include a policy field that includes instructions for processing the second digital signature, e.g.

during verification according to the digital signature process 420 in FIG. 4. In some cases, the extension includes a second public key of the entity which is associated with the second cryptosystem. In some instances, the extension includes a third digital signature generated using a third private key of the certificate authority which is associated with the third cryptosystem. In that case, the third digital signature of the certificate authority is verified according to the policy in the extension.

At 1220, the digital certificate is verified using the extension according to the policy in the extension. For example, the policy is the policy populated in the extension when the digital certificate is issued in response to a certificate signing request (CSR), described in FIG. 3. In some implementations, to verify the second digital certificate, a certificate digest is generated based at least in part on the extension, and the certificate digest and a public key of the certificate authority is used to verify the second digital signature of the certificate authority. In some cases, the public key of the certificate authority is associated with the second cryptosystem. For example, the public key corresponds to the second private key corresponding to the second cryptosystem, such that, the key pair for the certificate authority includes the second private key and the public key. In some implementations, the digital certificate comprises a plurality of signatures, including the first and second digital signatures. An identity of one or more of the plurality of signatures in the digital signature may be verified according to the policy. In an example, verification is performed by verifying the one or more of the plurality of signatures in the digital signature in the priority order indicated in the policy.

In some cases, a cryptographic signing technique is associated with a corresponding cryptosystem. In some instances, the digital certificate is successfully validated based on applying one or more cryptographic signing techniques required by the policy. In other instances, the digital certificate is successfully invalidated based on attempting to apply the one or more cryptographic signing techniques required by the policy. For example, as described in 410 of FIG. 4, and FIGS. 7 and 8.

In some cases, a policy database may be examined to locate an identity of each cryptographic signing technique required to process the digital certificate, and a policy is generated corresponding to the cryptographic signing techniques required. In some implementations, the policy is examined for instructions indicating a cryptographic signing technique for verifying the digital signature. In instances in which an acceptable cryptographic signing technique cannot be located for the second digital signature in the extension, the digital certificate invalidated in response to failing to locate the acceptable cryptographic signing technique.

In some cases, verifying the second digital signature of the certificate authority according to the policy in the extension is performed by entities that support the second cryptosystem. For example, in phase 1 of an upgrade (shown in FIG. 2B), only the applications that have been upgraded are able to access or understand the extension fields in order to perform an identification process using the second public key and the policy, such as the digital signature process 420 in FIG. 4.

In some implementations, the digital certificate comprises a plurality of signatures, including the first and second digital signatures. In some cases, an identity of one or more of the plurality of signatures in the digital signature are verified according to the policy. In some cases, the first cryptosystem is a legacy system and the second cryptosystem is a cryptosystem different from the first cryptosystem.

In other cases, the first cryptosystem comprises a quantum-vulnerable cryptosystem, and the second cryptosystem comprises a quantum-resistant cryptosystem.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, multiple cryptosystems are used.

In a first example, a digital certificate is issued. A certificate request that includes a first public key of an entity is received. The first public key is associated with a first cryptosystem. A digital certificate is generated that includes unpopulated fields. A public key field of the digital certificate is populated with the first public key of the entity. A policy field in an extension of the digital certificate is populated with a policy for processing a second digital signature associated with a second cryptosystem. A second digital signature is generated using a second private key of the certificate authority associated with the second cryptosystem. The second digital signature is generated from the digital certificate that includes the first public key and the policy fields. A second signature value field is populated in the extension of the digital certificate with the second digital signature. A first digital signature is generated using a first private key of the certificate authority. The first digital signature generated from the digital certificate that includes the first public key, the policy, and the second digital signature. The signature value field of the digital certificate is populated with the first digital signature. The digital certificate is transmitted from the certificate authority node to a node associated with the entity in response to the certificate request In some implementations of the first example, the digital certificate is issued by a computer system that includes a data processing apparatus and a computer readable medium, which stores instructions that are operable when executed by the data processing apparatus to perform operations for issuing the digital certificate.

Implementations of the first example may include one or more of the following features. A cryptographic signing technique is associated with each cryptosystem used in producing the digital certificate. A policy database is examined to locate an identity of each cryptographic signing techniques required to process the second digital signature in the digital certificate. The policy is generated corresponding to the cryptographic signing techniques, and is populated in the policy field in extension of the digital certificate.

Implementations of the first example may include one or more of the following features. A certificate request comprises a second public key of the entity associated with the second cryptosystem. A second public key field in the extension of the digital certificate is populated with the second public key of the entity. The policy comprises a policy, received in the certificate request or provided by the certificate authority, for processing a digital signature generated with the second public key of the entity. The first digital signature is generated from the digital certificate comprising the first public key, the second public key, the policy, and the second digital signature.

Implementations of the first example may include one or more of the following features. The digital signature comprises a plurality of signatures, and the plurality of signatures includes the first and second digital signatures. The policy includes instructions indicating an identity of one or more of the plurality of signatures in the signature to be verified. The policy contains instructions indicating a priority order for verifying the one or more of the plurality of signatures to be verified.

Implementations of the first example may include one or more of the following features. A third digital signature is generated using a third private key of the certificate authority associated with a third cryptosystem different from the first and second cryptosystems. Another digital signature field in the extension of the digital certificate is populated with the third digital signature prior to populating the second and first digital signature fields. The policy comprises instructions for processing the third digital signature.

In a second example, a digital certificate is authenticated. A digital certificate is received. The digital certificate includes a public key field including a first public key of an entity associated with a first cryptosystem, a signature value field including a first digital signature of a certificate authority associated with the first cryptosystem, and an extension. The extension includes a second signature value field including a second digital signature generated using a second private key of the certificate authority associated with the second cryptosystem, and a policy field comprising instructions for processing the second digital signature. The digital certificate is verified using the extension fields according to the policy.

In some implementations of the second example, the digital certificate is received by a computer system that includes a data processing apparatus and a computer readable medium, which stores instructions that are operable when executed by the data processing apparatus to perform operations, for example, of a cryptographic protocol.

Implementations of the second example may include one or more of the following features. A cryptographic signing technique is associated with a corresponding cryptosystem. The digital certificate is successfully validated based on applying one or more cryptographic signing techniques required by the policy, or the digital certificate is successfully invalidated based on attempting to apply the one or more cryptographic signing techniques required by the policy. The policy is examined for instructions indicating a cryptographic signing technique for verifying the digital signature, and invalidating the digital certificate in response to failing to locate the required cryptographic signing technique.

Implementations of the second example may include one or more of the following features. Verification of the second digital signature of the certificate authority is performed by entities that support the second cryptosystem according to the policy in the extension. Verifying the second digital certificate includes generating a certificate digest based at least in part on the extension, and using the certificate digest and a public key of the certificate authority to verify the second digital signature of the certificate authority. The public key of the certificate authority used to verify the second digital signature of the certificate authority is associated with the second cryptosystem.

Implementations of the second example may include one or more of the following features. The digital certificate includes a plurality of signatures. The plurality of signatures includes the first and second digital signatures. An identity of one or more of the plurality of signatures in the digital signature is verified according to the policy. The extension of the digital certificate includes a second public key of the entity associated with the second cryptosystem.

Implementations of the second example may include one or more of the following features. The extension includes a third digital signature generated using a third private key of the certificate authority associated with the third cryptosystem. The third digital signature of the certificate authority is verified according to the policy in the extension. The first cryptosystem is a legacy system and the second cryptosystem is a cryptosystem different from the first cryptosystem. The first cryptosystem comprises a quantum-vulnerable cryptosystem, and the second cryptosystem comprises a quantum-resistant cryptosystem.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be used. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A cryptography method comprising:
receiving a digital certificate comprising:
a plurality of signatures of a certificate authority, the plurality of signatures comprising a first digital signature of the certificate authority and a second digital signature of the certificate authority;
a first public key field comprising a first public key of an entity, the first public key of the entity associated with a first cryptosystem;
a signature value field comprising the first digital signature of the certificate authority, the first digital signature associated with the first cryptosystem; and
an extension comprising:
a second signature value field comprising the second digital signature of the certificate authority, the second digital signature of the certificate authority being associated with a second cryptosystem, and
a policy field comprising a policy comprising instructions indicating:
cryptographic signing techniques required for verifying the plurality of signatures of the certificate authority, wherein cryptographic signing techniques are associated with the respective first and second cryptosystems, and
a priority order for verifying the plurality of signatures of the certificate authority; and
verifying, by operation of one or more processors, the digital certificate according to the policy in the extension, wherein verifying the digital certificate comprises:
generating a certificate digest based at least in part on the extension; and
verifying one or more of the plurality of signatures of the certificate authority using the certificate digest and a public key of the certificate authority, according to one or more of the required cryptographic signing techniques and the priority order.

2. The method of claim 1, further comprising:
invalidating the digital certificate in response to a failure to locate the required cryptographic signing techniques.

3. The method of claim 1,
comprising verifying the second digital signature of the certificate authority according to the policy in the extension.

4. The method of claim 1, wherein the public key of the certificate authority is associated with the second cryptosystem.

5. The method of claim 1, wherein the extension of the digital certificate comprises a second public key of the entity, the second public key being associated with the second cryptosystem.

6. The method of claim 1, wherein the extension further comprises:
- a third digital signature of the certificate authority, the third digital signature of the certificate authority being associated with a third cryptosystem; and
- wherein verifying the digital certificate comprises verifying the third digital signature of the certificate authority according to the policy in the extension.

7. The method of claim 1, wherein the first cryptosystem is a legacy system and the second cryptosystem is a different type from the first cryptosystem.

8. The method of claim 1, wherein the first cryptosystem comprises a quantum-vulnerable cryptosystem, and the second cryptosystem comprises a quantum-resistant cryptosystem.

9. The method of claim 1, wherein the digital certificate is a hybrid digital certificate associated with a transition between the first and second cryptosystems.

10. A computer system comprising:
- a data processing apparatus; and
- a non-transitory computer readable medium storing instructions that are operable when executed by the data processing apparatus to perform operations comprising:
  - receiving a digital certificate comprising:
    - a plurality of signatures of a certificate authority, the plurality of signatures comprising a first digital signature of the certificate authority and a second digital signature of the certificate authority;
    - a first public key field comprising a first public key of an entity, the first public key of the entity associated with a first cryptosystem;
    - a signature value field comprising the first digital signature of the certificate authority, the first digital signature associated with the first cryptosystem; and
    - an extension comprising:
      - a second signature value field comprising the second digital signature of the certificate authority, the second digital signature of the certificate authority being associated with a second cryptosystem, and
      - a policy field comprising a policy comprising instructions indicating:
        - cryptographic signing techniques required for verifying the plurality of signatures of the certificate authority, wherein cryptographic signing techniques are associated with the respective first and second cryptosystems, and
        - a priority order for verifying the plurality of signatures of the certificate authority; and
  - verifying the digital certificate according to the policy in the extension, wherein verifying the digital certificate comprises:
    - generating a certificate digest based at least in part on the extension; and
    - verifying one or more of the plurality of signatures of the certificate authority using the certificate digest and a public key of the certificate authority, according to one or more of the required cryptographic signing techniques and the priority order.

11. The system of claim 10, the operations further comprising:
- invalidating the digital certificate in response to a failure to locate the required cryptographic signing techniques.

12. The system of claim 10, wherein the extension of the digital certificate comprises a second public key of the entity, the second public key being associated with the second cryptosystem.

13. The system of claim 10, wherein the extension further comprises:
- a third digital signature of the certificate authority, the third digital signature of the certificate authority being associated with a third cryptosystem; and
- wherein verifying the digital certificate comprises verifying the third digital signature of the certificate authority according to the policy in the extension.

14. The system of claim 10, wherein the digital certificate is a hybrid digital certificate associated with a transition between the first and second cryptosystems.

15. A non-transitory computer readable medium comprising instructions, which when executed by one or more processors, perform operations comprising:
- receiving a digital certificate comprising:
  - a plurality of signatures of a certificate authority, the plurality of signatures comprising a first digital signature of the certificate authority and a second digital signature of the certificate authority;
  - a first public key field comprising a first public key of an entity, the first public key of the entity associated with a first cryptosystem;
  - a signature value field comprising the first digital signature of the certificate authority, the first digital signature associated with the first cryptosystem; and
  - an extension comprising:
    - a second signature value field comprising the second digital signature of the certificate authority, the second digital signature of the certificate authority being associated with a second cryptosystem, and
    - a policy field comprising a policy comprising instructions indicating:
      - cryptographic signing techniques required for verifying the plurality of signatures of the certificate authority, wherein cryptographic signing techniques are associated with the respective first and second cryptosystems, and
      - a priority order for verifying the plurality of signatures of the certificate authority; and
- verifying the digital certificate according to the policy in the extension, wherein verifying the digital certificate comprises:
  - generating a certificate digest based at least in part on the extension; and
  - verifying one or more of the plurality of signatures of the certificate authority using the certificate digest and a public key of the certificate authority, according to one or more of the required cryptographic signing techniques and the priority order.

16. The non-transitory computer readable medium of claim 5, the operations further comprising:
- invalidating the digital certificate in response to a failure to locate the required cryptographic signing techniques.

17. The non-transitory computer readable medium of claim 15, wherein the extension of the digital certificate comprises a second public key of the entity, the second public key being associated with the second cryptosystem.

18. The non-transitory computer readable medium of claim 15, wherein the extension further comprises:
- a third digital signature of the certificate authority, the third digital signature of the certificate authority being associated with a third cryptosystem; and
- wherein verifying the digital certificate comprises verifying the third digital signature of the certificate authority according to the policy in the extension.

19. The non-transitory computer readable medium of claim 15, wherein the digital certificate is a hybrid digital certificate associated with a transition between the first and second cryptosystems.

\* \* \* \* \*

UNITED STATES PATENT AND TRADEMARK OFFICE
CERTIFICATE OF CORRECTION

PATENT NO. : 10,841,295 B1
APPLICATION NO. : 16/387245
DATED : November 17, 2020
INVENTOR(S) : Pecen et al.

Page 1 of 1

It is certified that error appears in the above-identified patent and that said Letters Patent is hereby corrected as shown below:

In the Specification

Column 37, Lines 24-25, Delete "cryptosystem—the" and insert -- cryptosystem, the -- therefor In the Claims Column 48, Line 61, In Claim 16, delete "claim 5," and insert -- claim 15, -- therefor Signed and Sealed this
Twelfth Day of January, 2021

Andrei Iancu
*Director of the United States Patent and Trademark Office*